US012217255B2

(12) United States Patent
Brenner et al.

(10) Patent No.: US 12,217,255 B2
(45) Date of Patent: Feb. 4, 2025

(54) MEDIA LICENSING METHOD AND SYSTEM USING BLOCKCHAIN

(71) Applicant: Dubset Media Holdings, Inc., San Francisco, CA (US)

(72) Inventors: Vadim Brenner, San Francisco, CA (US); Stephen White, San Francisco, CA (US); Mijat Nenezic, Miami Beach, FL (US); Srdan Marković, Belgrade (RS)

(73) Assignee: Dubset Media Holdings, Inc., San Francisco, CA (US)

( * ) Notice: Subject to any disclaimer, the term of this patent is extended or adjusted under 35 U.S.C. 154(b) by 531 days.

(21) Appl. No.: 16/381,405

(22) Filed: Apr. 11, 2019

(65) Prior Publication Data

US 2019/0318348 A1    Oct. 17, 2019

Related U.S. Application Data

(60) Provisional application No. 62/657,475, filed on Apr. 13, 2018.

(51) Int. Cl.
*G06Q 20/38* (2012.01)
*G06Q 50/18* (2012.01)

(52) U.S. Cl.
CPC ....... *G06Q 20/389* (2013.01); *G06Q 20/3829* (2013.01); *G06Q 50/184* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 7,381,883 | B2 * | 6/2008 | Weare | G11B 27/105 84/668 |
| 8,655,826 | B1 * | 2/2014 | Drewry | G06F 21/10 706/48 |
| 10,719,586 | B2 * | 7/2020 | Lenchner | G06Q 50/184 |
| 10,834,062 | B2 * | 11/2020 | Androulaki | H04L 9/0643 |

(Continued)

FOREIGN PATENT DOCUMENTS

| | | | | |
|---|---|---|---|---|
| WO | WO-2005025116 A2 * | 3/2005 | | G06F 21/105 |
| WO | WO-2008144528 A2 * | 11/2008 | | G06Q 10/00 |

(Continued)

OTHER PUBLICATIONS

Deeb, H. N., "Remixing Authorship Copyright and Capital in Hollywood's New Media Age", University of California, Los Angeles, ProQuest Dissertations & Theses. (2014) (Year: 2014).*

*Primary Examiner* — Clay C Lee
(74) *Attorney, Agent, or Firm* — Hogan Lovells US LLP

(57) ABSTRACT

Systems and methods in accordance with various embodiments of the present disclosure may overcome one or more of the aforementioned and other deficiencies experienced in conventional approaches to distribute media content digitally and manage associated intellectual property rights in a secure, immutable, efficient, and automatic manner. Intellectual property rights associated with media content can include copyright, trademarks, licenses to composition, synchronization, performance, recordings, etc. In particular, various embodiments provide media licensing management using blockchains.

20 Claims, 13 Drawing Sheets

(56) References Cited

U.S. PATENT DOCUMENTS

| | | | |
|---|---|---|---|
| 10,956,945 B1* | 3/2021 | Lewis | G06Q 30/0276 |
| 2007/0094139 A1* | 4/2007 | Martinez | G06Q 30/00 |
| | | | 705/40 |
| 2012/0239558 A1* | 9/2012 | Zhang | G06Q 40/00 |
| | | | 705/35 |
| 2012/0323800 A1* | 12/2012 | Stein | H04L 63/10 |
| | | | 705/310 |
| 2014/0161356 A1* | 6/2014 | Tesch | G06K 9/00 |
| | | | 382/196 |
| 2015/0067512 A1* | 3/2015 | Roswell | H04L 12/1813 |
| | | | 715/716 |
| 2015/0135206 A1* | 5/2015 | Reisman | H04H 20/93 |
| | | | 725/18 |
| 2017/0116693 A1* | 4/2017 | Rae | G06Q 50/184 |
| 2017/0206523 A1* | 7/2017 | Goeringer | G06Q 20/409 |
| 2018/0041345 A1* | 2/2018 | Maim | H04L 9/32 |
| 2019/0155997 A1* | 5/2019 | Vos | G06F 21/105 |
| 2019/0205467 A1* | 7/2019 | Wold | G06F 16/683 |
| 2019/0220836 A1* | 7/2019 | Caldwell | G06Q 20/38215 |
| 2019/0318348 A1* | 10/2019 | Brenner | G06Q 20/1235 |
| 2020/0074470 A1* | 3/2020 | Deshpande | H04L 9/3239 |
| 2020/0204350 A1* | 6/2020 | Kramer | G06Q 20/401 |
| 2020/0211011 A1* | 7/2020 | Anderson | G06Q 20/389 |
| 2020/0286081 A1* | 9/2020 | Anderson | G06Q 20/401 |
| 2020/0349565 A1* | 11/2020 | Chan | G06Q 10/10 |
| 2020/0351657 A1* | 11/2020 | Wentz | H04W 12/06 |

FOREIGN PATENT DOCUMENTS

| | | | | |
|---|---|---|---|---|
| WO | WO-2009124002 A1 * | 10/2009 | | G06F 16/41 |
| WO | WO-2015183148 A1 * | 12/2015 | | G06F 17/30743 |

* cited by examiner

MEDIA LICENSING METHOD AND SYSTEM USING BLOCKCHAIN

CROSS-REFERENCE TO RELATED APPLICATIONS

This U.S. Non-provisional patent application claims priority to and benefit of U.S. Provisional Patent Application No. 62/657,475 filed Apr. 13, 2018, which is hereby incorporated by reference herein in its entirety.

BACKGROUND

Advancements in technology are constantly influencing and evolving the music and media content industry, not only in how it is distributed and stored, but also how it is created. While traditional instruments can produce analog music that can then be recorded, converted to a digital format to be stored and distributed electronically, music can now also be created digitally from its conception. Many users compile and mix various music samples digitally for distribution as their own music, which can raise a problem in determining the appropriate licensing rights associated with the music samples used in mixes. With the convenience and ease of portable digital music players, smartphones, cloud computing, and seemingly infinite digital libraries of music, there is an increased need in the industry to distribute media digitally and electronically while preserving all the associated intellectual property rights.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to distribute media content digitally and manage associated intellectual property rights in a secure, immutable, efficient, and automatic manner. Intellectual property rights associated with media content can include copyright, trademarks, licenses to composition and/or recording, synchronization, performance, recordings, etc. In particular, various embodiments provide media licensing management using blockchains (i.e., secure, distributed, linked ledgers).

Music creation has undergone exponential growth giving rise to a new wave of creators, musicians, remixers, and curators. In the last 80 years, the music industry has recorded and registered 5 million hours of new music. In comparison, every two months, the DJ community creates 5 million hours of new recorded music. The DJ community consists of musicians and individual users or consumers, and their music generally involves sampling, mixing, modifying, and compiling snippets of other music created by other artists. The music created by the DJ community can be referred to as user-generated content (UGC), or UGC media content. With the advent of the internet and digital media processing, UGC has exploded because users can now easily create their own music and videos. Currently, users upload about 20,000 tracks of music per day on Spotify™, compared to 260,000 tracks of music uploaded by users on SoundCloud™ and 2,600,000 tracks of music uploaded by users on YouTube™. Outside of YouTube™, music services are not equipped to properly handle UGC.

The technical problems in handling UGC include first the identification of sampled music in UGC, for example, in determining what master recording and master compositions are being sampled within the user generated music. Second, once the music sampled has been identified, then the multiple rights holders and their corresponding associated rights may be notified in advance of distribution. Lastly, the internet has posed a territorial problem in the distribution of the music, as there are many complexities and different laws associated with access to media content and cross rights-by-territory. Embodiments of the present invention centralize UGC to give DJs, users, rights holders, and distributors an accessible platform to manage their music and rights in an improved, user-friendly, intuitive, efficient, and secure manner. Embodiments of the present invention provide the digital media processing technology, rights management database, and user-friendly interfaces to allow users to create new mix and remix distribution and monetization opportunities built on transparency, ownership control, and simplicity.

Figure 1:
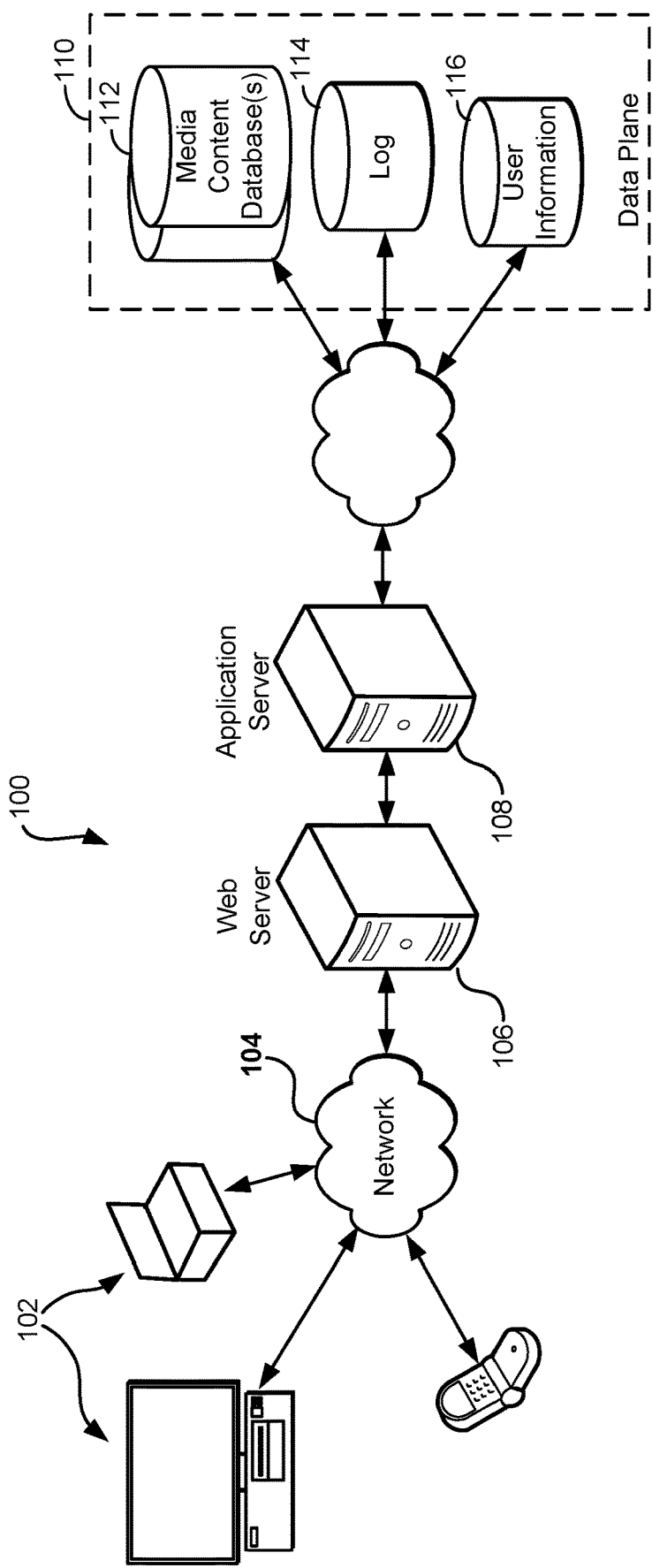
FIG. 1 illustrates an environment in which various embodiments can be implemented.

FIG. 1 illustrates an example of an environment 100 for implementing aspects in accordance with various embodiments. Although a Web-based environment is used for purposes of explanation, different environments may be used, as appropriate, to implement various embodiments. An electronic client device 102 can include any appropriate device operable to send and receive requests, messages, or information over an appropriate network 104 and convey information back to a user of the device; examples of client devices include personal computers, cell phones, handheld messaging devices, laptop computers, set-top boxes, personal data assistants, electronic book readers, etc. The network can include any appropriate network, including an intranet, the Internet, a cellular network, a local area network, or any other such network or combination thereof. Components used for such a system can depend at least in part upon the type of network and/or environment selected. Protocols and components for communicating via such a network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110. Resources of this plane are not limited to storing and providing access to data, but there can be several application servers, layers, or other elements, processes, or components, which may be linked or otherwise configured, to interact and perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any suitable hardware and software for integrating with the data store as needed to execute aspects of one or more applications for the client device, handling a majority of the data access and business logic for an application. The application server provides admission control services in cooperation with the data store, and may be able to generate content such as text, graphics, audio, and/or video to be transferred to the user, which may be served to the user by the Web server in the form of HTML, XML, or another appropriate structured language in this example. In some embodiments, the Web server 106, application server 108 and similar components may be part of the data plane. The handling of all requests and responses, as well as the delivery of content between the client device 102 and the application server 108, can be handled by the Web server.

The data stores of the data plane 110 can include several separate data tables, databases, blocks, blockchains, or other data storage mechanisms for storing data relating to processing media content and managing licensing rights associated with the media content. For example, the data plane illustrated includes mechanisms for storing media content data 112 and user information 116, which can be used to receive, process, store, and serve media content. The data plane also is shown to include a mechanism for storing log data 114, which can be used for purposes such as reporting, analysis, and determining a chain of custody for media content. It should be understood that there can be many other aspects that may need to be stored in a data store, such as for access right information, which can be stored in any of the above listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might upload UGC. In this case, components of the data plane might access the user information to verify the identity of the user, process the UGC, and access the media content catalog detail information to obtain information about the UGC and determine associated licensing rights with the media content identified in the UGC. The information then can be returned to the user, such as in a results listing on a Web page that the user is able to view via a browser on the user device 102, showing the identified media content in the UGC, the rights holders of the media content, and licensing information associated with the media content. Information for the media content of interest can be viewed in a dedicated page or window of the browser.

Each server typically may include an operating system that provides executable program instructions for the general administration and operation of that server, and typically will include a computer-readable medium storing instructions that, when executed by a processor of the server, enable the server to perform its intended functions. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

In some embodiments, the media content processing system may include a centralized registry that contains the digital assets, such as the licensing rights, along with associated metadata. Advanced content identification technologies may be implemented to unravel the complexities of derivative works of media content whose rights holders have been identified. Local licensing nodes may enable individual rights holders to access data and establish rules. The media content processing system may provide a global exchange that networks and connects all nodes together enabling cross-rights holder content licensing and clearance. Rights holders and content creators can manage their mix and remix catalogs efficiently across music services. In some embodiments, the media content processing system may also include a marketplace providing media service providers and rights holders a seamless one-click approach to program approvals and the required catalog licensing. Rights holders may be able to choose where their content is distributed and how they generate revenue through digital assets, such as composition rights, recording rights, performance rights, synchronization rights, etc. The media content processing system allows rights holders to be in control of where media content is distributed, while allowing media service providers to offer pricing models and revenue splits that suit their business.

According to embodiments of the present application, the media content processing system may create an offer, for example, a media content service provider may offer per stream or revenue share pricing models directly to rights holders. Subsequently, the rights holders may review offers.

Rights holders may be able to review the program details, including revenue splits, territory splits, and guaranteed minimums. After reviewing the offers, the rights holders may choose to accept offers. Rights holders accept the pricing models that work best for them and content is distributed.

These transactions may be performed with the security, immutability, and transparency of blockchain (i.e., a secure distributed linked ledger), which provides both private and public access. Advantages of using blockchain to conduct media content and digital asset processing includes a central registry of media content registration information (e.g., mixes/remixes) that is secure. The blockchain may also provide immutable rights ownership and association with the media content, which can be determined using a repository of business rules for use and distribution. Additionally, a marketplace for financial terms and program details/approvals can include clearance, distribution, consumption and royalty information, real-time wallet information, reporting and payments on scheduled intervals or in real time.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

A block chain or blockchain is a distributed database that maintains a continuously growing list of data records that are hardened against tampering and revision, even by operators of the data store's nodes. The most widely known application of a blockchain is the public ledger of transactions for cryptocurrencies used in bitcoin. This record is enforced cryptographically and hosted on machines running the software.

The core advantages of the blockchain architecture include the following: The ability for a large number of nodes to converge on a single consensus of the most up-to-date version of a large data set such as a ledger, even when the nodes are run anonymously, have poor connectivity with one another, and whose operators could be dishonest. Blockchain also provides the ability for any node that is well-connected to other nodes to determine, with a reasonable level of certainty, whether a transaction does or does not exist in the confirmed data set. The ability for any node that creates a transaction to, after a certain period of confirmation time, determine with a reasonable level of certainty whether the transaction is valid, able to take place, and become final (i.e. that there were no conflicting transactions confirmed into the block chain elsewhere that would make the transaction invalid, such as the same currency units "double-spent" somewhere else). Furthermore, blockchain introduces a prohibitively high cost to attempt to rewrite or alter any transaction history. An automated form of resolution that ensures that conflicting transactions (such as two or more attempts to spend the same balance in different places) never become part of the confirmed data set.

A blockchain implementation consists of two kinds of records: transactions and blocks. Transactions are the actual data to be stored in the blockchain, and blocks are records that confirm when and in what sequence certain transactions became recorded as a part of the block chain database. Transactions are created by participants/users using the system in the normal course of business (in the case of cryptocurrencies, a transaction is created anytime someone sends cryptocurrency to another), and blocks are created by users known as "miners" who use specialized software or equipment designed specifically to create blocks.

Users of the system create transactions, which are loosely passed around from node to node on a best-effort basis. The definition of what constitutes a valid transaction is based on the system implementing the blockchain. In most cryptocurrency applications, a valid transaction is one that is properly digitally signed, spends currency units from a known valid wallet, and meets various other requirements such as including a sufficient miner "fee" and/or a certain time elapsed since the currency units were previously involved in a transaction.

Meanwhile, miners attempt to create blocks that confirm and incorporate those transactions into the blockchain. In a cryptocurrency system such as bitcoin, miners are incentivized to create blocks in order to collect two types of rewards: a pre-defined per-block award and fees offered within the transactions themselves, payable to any miner who successfully confirms the transaction.

Embodiments of the invention provide systems and methods of using blockchain technology, in the areas of:
Private and public access;
A record of rights ownership (recordings and compositions);
Derivative works registration (mixes and remixes)—registration date, who uploaded, who created it, etc.;
List of copyrighted components that make up the derivative work, with rights holder association;
Claims and resolution of rights;
Repository of business rules for use and distribution, including financial terms;
Clearance information against business rules, including takedowns;
Distribution, consumption and financial/payment transaction reporting;
Real-time wallet information on royalties accrual, based on usage reporting; and
Reporting and payments triggers through blockchain, on scheduled intervals or in real time as consumption data and payments are received.

Figure 2:
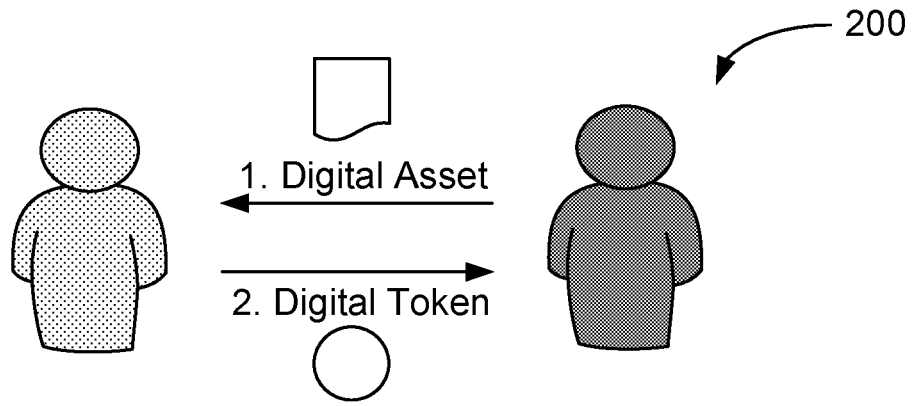
FIG. 2 illustrates an example diagram of how digital assets and currency transactions may be conducted according to various embodiments.

FIG. 2 illustrates an example diagram 200 of how digital assets and currency transactions may be conducted according to various embodiments of the present application. Similar to traditional transactions, money may be exchanged for goods or services. In digital space, a token (e.g., digital currency) may be exchanged for a digital asset (e.g., licensing or other monetization of intellectual property rights to media content).

However, an issue with digital assets is that they can potentially be easily replicated, copied, and counterfeited. This creates a risk that the digital asset can be cloned and transferred many times, which may be referred to as double spending. Also, there may be a risk that multiple entities may own (or believe they own) the same digital asset and not be able to distinguish who the owner is. To address the accurate ownership issue, cryptography may be used.

Figure 3:
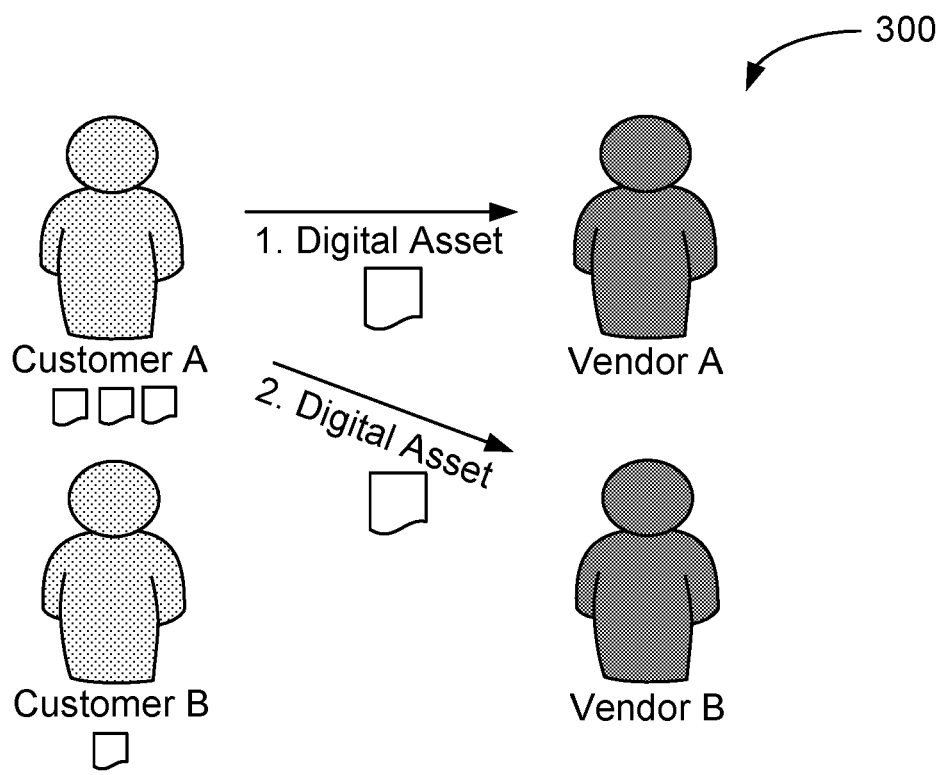
FIG. 3 illustrates an example technique of conducting a digital transaction using cryptography in accordance with various embodiments.

FIG. 3 illustrates an example technique 300 of conducting a digital transaction using cryptography in accordance with various embodiments. A private and public key-pair may be issued to ensure the authenticity of the digital asset and its ownership. Both keys may be mathematically related to each other. With the use of the private key, a digital signature may be created and associated with the digital asset. Once the digital asset is provided to another party, the digital signature is verified using the public key, by that other party, to validate the authenticity. This process may be called a signing and verifying of a Digital Token. For example, as shown in 300, a first digital asset may be signed using a private key of Customer A and sent to Vendor A, and a second digital asset may be signed using a private key of Customer A and sent to Vendor B.

Figure 4:
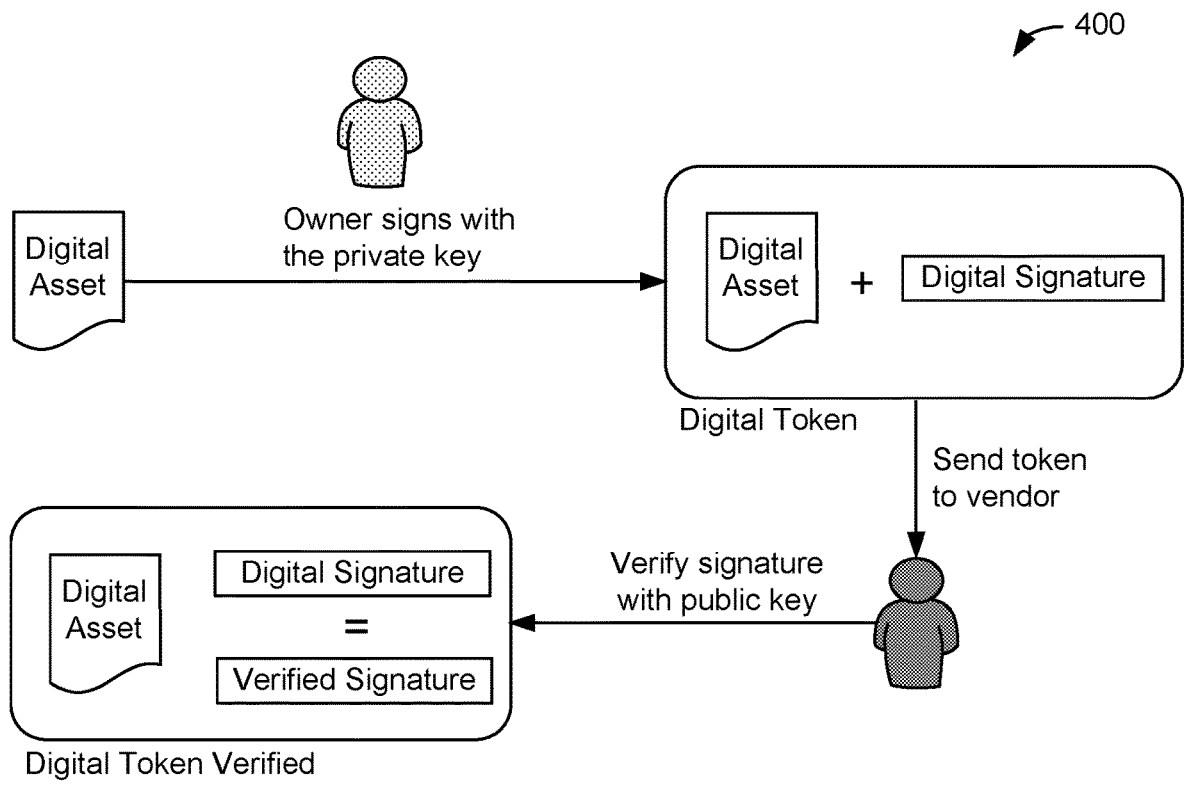
FIG. 4 illustrates an example technique of verifying an owner of a digital asset in accordance with various embodiments.

FIG. 4 illustrates an example technique 400 of verifying an owner of a digital asset in accordance with various embodiments. As digital tokens are sent and verified, there is a need to ensure that there is a way to uniquely identify the owner of the account. This may be achieved through a pair of public-private cryptographic keys that create what is, in essence, an equivalent of a bank account. For example, as shown in 400, the owner of a digital asset may use the digital token along with the owner's private key to create a digital token to be sent to a vendor. The vendor may verify the digital token using the vendor's public key, and as such may create a verified digital token, which includes the digital asset and a digital signature, which has been verified.

Figure 5:
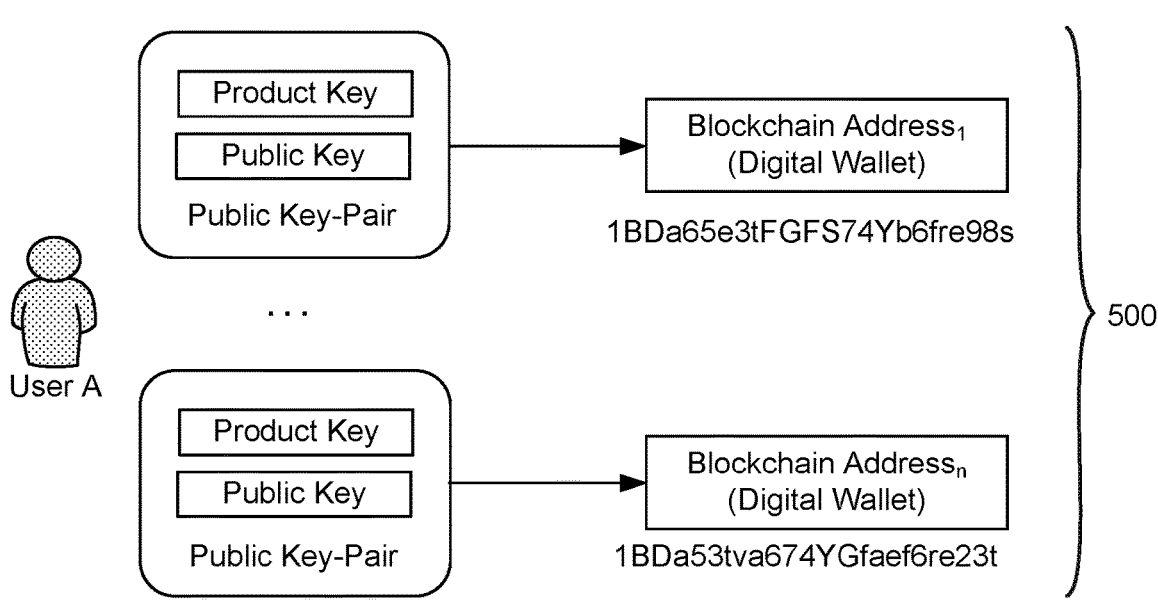
FIG. 5 illustrates an example of a digital wallet in accordance to various embodiments.

FIG. 5 illustrates an example of a digital wallet 500 in accordance with various embodiments. User A may have various product key and public key pairs, which each correspond to a blockchain address in the user's digital wallet, where the private key is stored. A blockchain digital wallet, or simply a digital wallet, may allow users to manage their assets and related information. A user's private key may be associated with each digital wallet. When the public key associated with an asset/product matches the private key in a user (e.g., User A's) wallet, ownership of the asset/product may be associated with that user (User A), and that user's wallet (User A's wallet). As such, User A may be an owner of multiple assets/products, and these assets/products may be associated with User A's wallet. Information such as royalty payments due to a user, based on the user's owned assets, may also be stored in the user's digital wallet.

Figure 6:
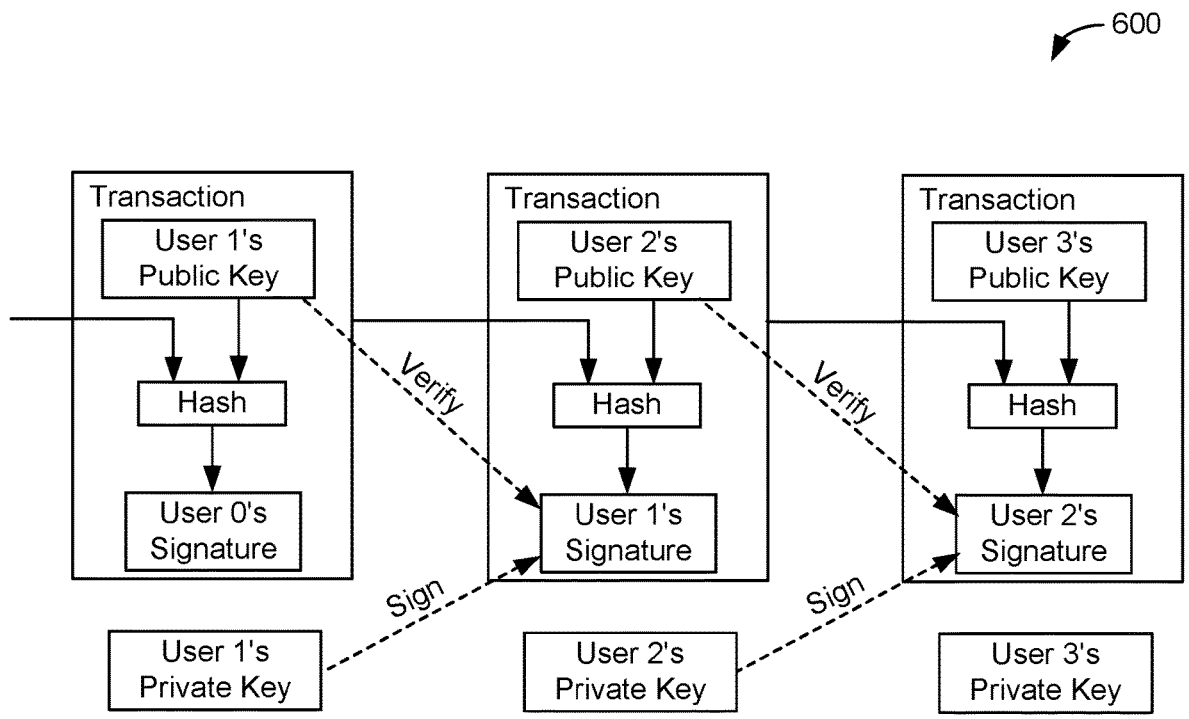
FIG. 6 illustrates an example blockchain according to various embodiments.

FIG. 6 illustrates an example blockchain 600 according to various embodiments. The transfer of digital assets is known as a transaction. Transactions may be stored as entries of a blockchain. Blockchain 600 has a database structure customized for media content and the intellectual property rights and digital assets, such as media content licenses, associated with the media content. Particularly with digital music, many users may be creating UGC, which includes derivative works of existing media content (e.g., music), as a majority of UGC includes and are comprised of segments (e.g., micro-blocks or portions) of other existing music that is mixed, remixed, modified, or edited in some fashion. In a world of derivative content where users are constantly creating and uploading media content that includes multiple media works and intellectual property that is owned by others, the chain of custody and ownership of those segments of media content can be difficult to manage. Blockchain, according to embodiments of the present application, provides a solution to the technical problem of determining the chain of custody and associated rights (e.g., intellectual property rights in the composition, performance, recording, synchronization, etc.) for each segment of identified media content of which the UGC is comprised. Such associated rights, monetization of such rights (e.g., licenses), and/or any related transactions may each be separately stored on a blockchain, such as blockchain 600. As an example, assets such as intellectual property rights licenses associated with the composition of a track that is identified as a segment of a UGC work (mix/remix media content), may be recorded as a transaction in the blockchain 600.

Figure 7:
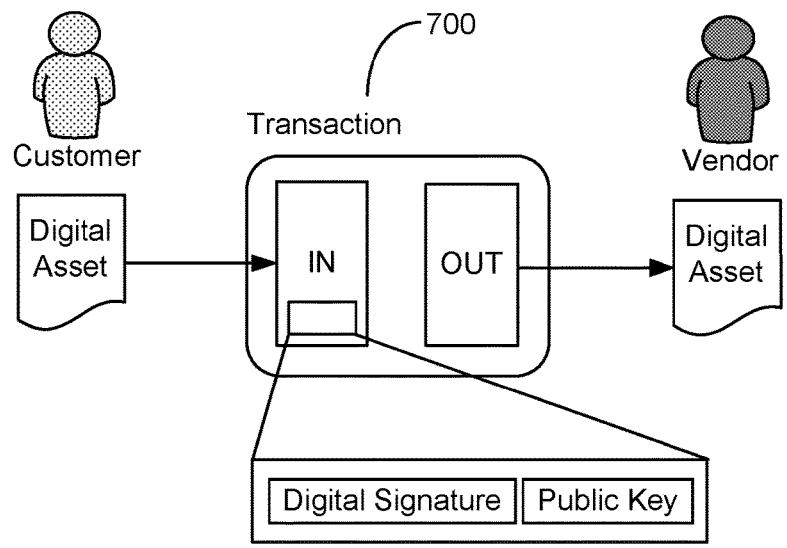
FIG. 7 illustrates a digital transaction using blockchain in accordance with various embodiments.

FIG. 7 illustrates a digital transaction 700 using blockchain in accordance with various embodiments. The blockchain, as shown in FIG. 7, contains the origin (marked IN) and destination (marked OUT) of the transaction. Ownership may be clearly indicated through digital signatures that may be created with a private key, and the associated public key, which can be used for validation (on the receiving end) that the transferred digital assets are really owned by the sender. And while the public key may be known, the true identity of the sender or the destination may not be known. For example, a customer (e.g., an owner of intellectual property rights related to media content) who wants to transfer/share a digital media asset to/with a vendor (e.g., a media service) may sign the digital asset using the customer's private key. In addition, a vendor who receives the digital asset may be able to verify that the customer is the true owner of the digital media asset using the public key associated with the customer's private key. This transfer/sharing of the media asset may be a transaction, which may be included in one or more blockchains.

Figure 8:
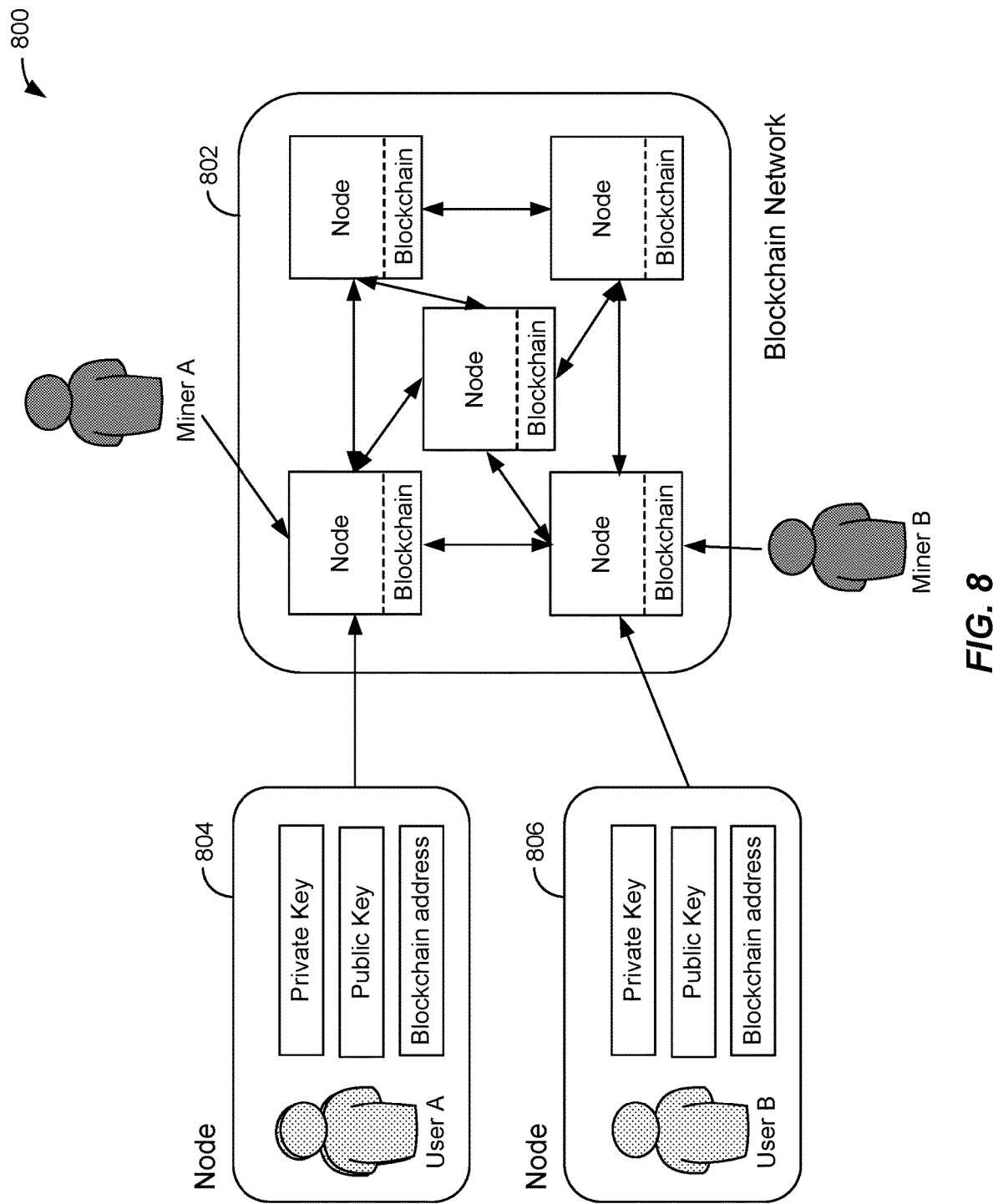
FIG. 8 illustrates an example technique of using a blockchain to process media content and managing media content licensing in accordance with various embodiments.

FIG. 8 illustrates an example technique 800 of using a blockchain to process media content and managing media content licensing in accordance with various embodiments. FIG. 8 illustrates that blockchain is recorded in a peer-to-peer network 802 of shared ledgers (decentralized). FIG. 8 also illustrates that each blockchain may be recorded on top of the other with each blockchain output leading into an input of another blockchain (as also illustrated in FIG. 6). Every client in the network may own a copy of the blockchain. This allows for quick verification (e.g., of transactions) and transparency.

The peer-to-peer network 802 may include multiple interconnected clients (interconnected through wired or wireless communications means), each of which may equivalently be represented as a node. The nodes of the network may be responsible for validating transactions received to be added to the blockchain. Once any transaction is validated, the client/node that validated the transaction may communicate (e.g., broadcast) the transaction to neighboring nodes (i.e., nodes that may be in direct communication with the validating node) until each node has a copy of the transaction. For example, as shown by technique 800, client/node 804 may be associated with a User A, and client/node 806 may be associated with a User B. Each node may also be associated with at least one private encryption key, one or more public encryption keys (paired with the private encryption key), and a blockchain address. In addition, Miner A and Miner B may add transaction records to the blockchain/ledgers at various nodes.

Figure 9:
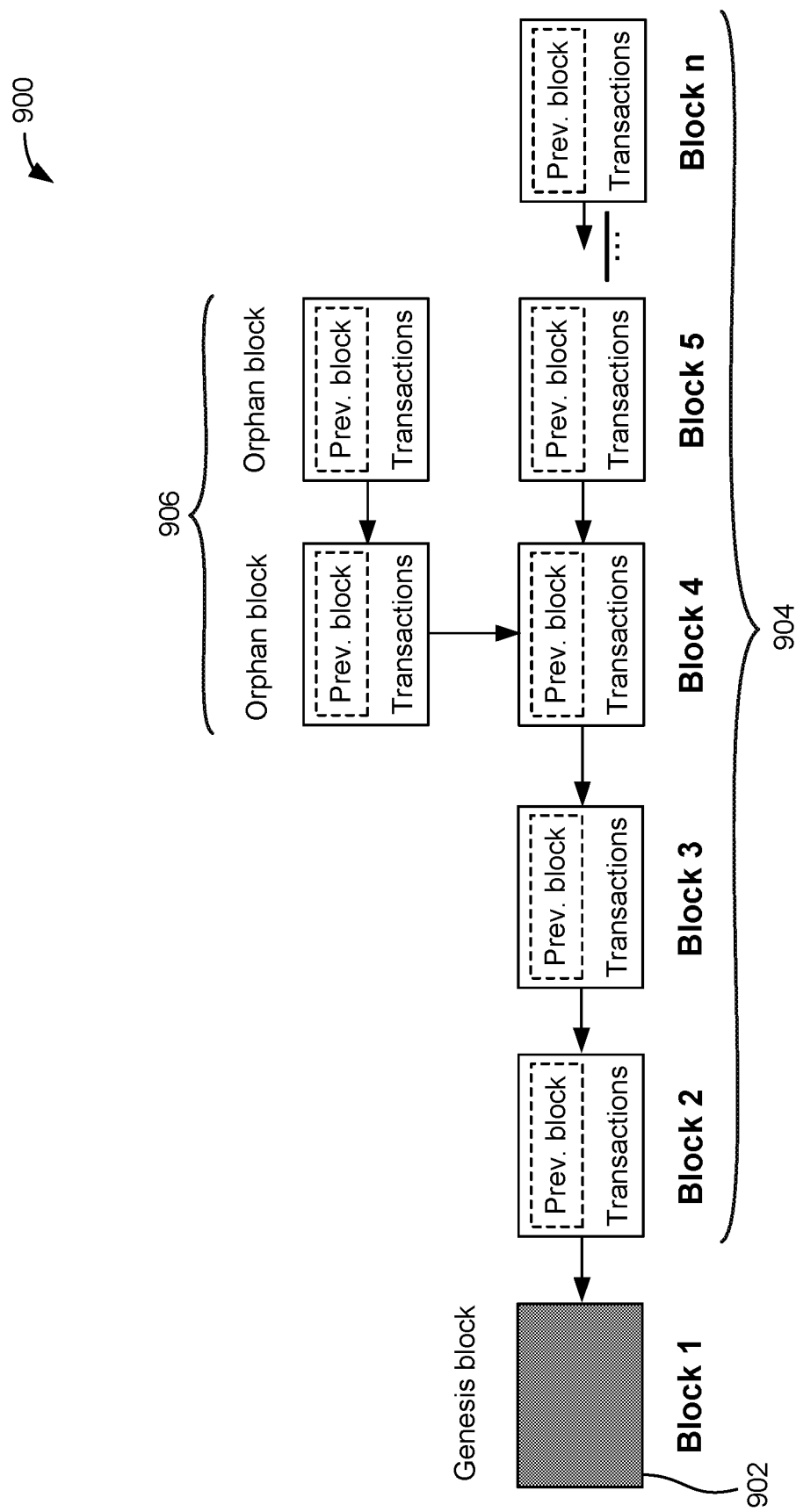
FIG. 9 illustrates an example blockchain in accordance with various embodiments.
Figure 10:
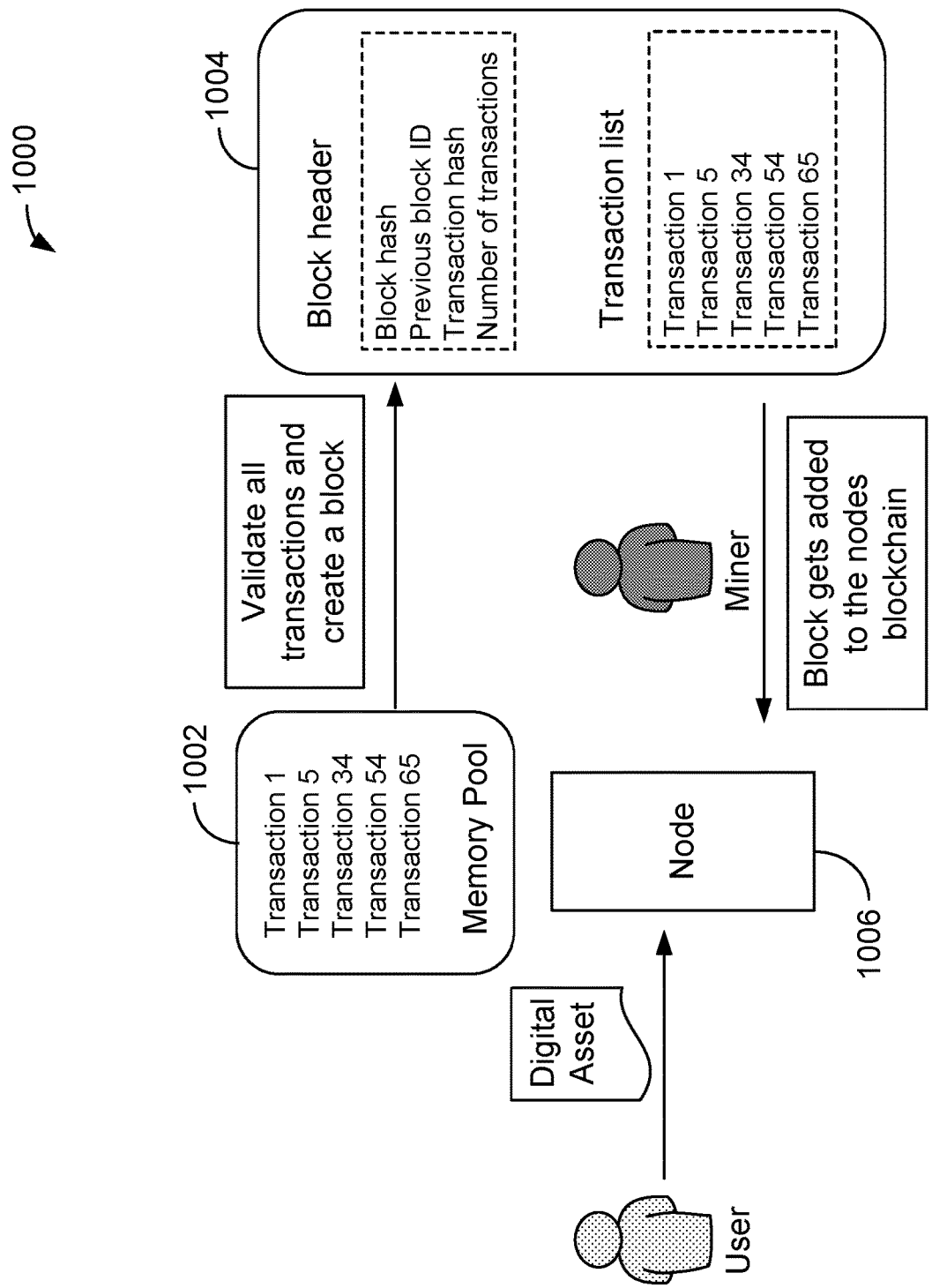
FIG. 10 illustrates an example technique for processing media content licenses for users in accordance with various embodiments.

FIG. 9 illustrates an example blockchain 900 in accordance with various embodiments. All transactions may be stored as blockchain bundles (i.e., one or more transactions bundled together). This is known as the "blockchain block." Once such a block is created, it may be broadcast to all the other nodes in a peer-to-peer network (such as what is shown in FIG. 8) so that, most, if not every node in the network can update its blockchain. Each such block may be linked to the previous such block. In this manner, a chain may be created that can be traced (and which is linked) to the first block ever created in the blockchain. This first block may be known as the "Genesis block." For example, blockchain 900 includes a genesis block 902 of bundled transactions in a blockchain. The genesis block is Block 1 of the blockchain and several other blocks 904 (Block 2, Block 3, Block 4, Block 5, . . . Block n) are each sequentially connected to the previous block of the blockchain. FIG. 9 also shows two orphan blocks 906, which may be blocks which include one or more transactions that were not accepted into the blockchain for a variety of reasons FIG. 10 illustrates an example technique 1000 for processing media content licenses for users in accordance with various embodiments. The users who are responsible for making blockchain blocks may be known as "miners" and the process of making the blocks by the miners may be called "mining." Miners may have dedicated clients that use specific protocols to connect to the network. As discussed above, transactions may get bundled into blockchain blocks. Once a transaction gets bundled into a block and is accepted by a large majority of the network, it is considered official. As an example, in FIG. 10, a user may perform an action (such as listening to a UGC mix/remix that involves a particular track associated with a media license) on a digital service (such as an online music service) that implicates a digital asset (such as a license). Such an action may trigger one or more transactions (e.g., one or more payments to be made to intellectual property rights holders based on the media license). Such transactions may be grouped together in a memory pool 1002. The transactions may then be validated (e.g., using private-public key cryptographic pairs), and a blockchain block 1004 might be created (e.g., by a miner) and block 1004 may include the bundled transactions. Each such block may include a block hash, a previous block ID, a transaction hash, a number of transactions, and a list that lists each of the bundled transactions. Once created, such a block may be added to the blockchain of a node 1006 by a miner.

Once a node, such as node 1006, receives a block from a miner, it may be added it to its local blockchain, and then it may be broadcast to the other nodes in the peer-to-peer network of nodes. Each block may include any number of transactions. However, this technique may still include issues involving trusting the miners within the network. This is because any single entity controlling a sufficient number of miners could potentially subvert the blockchain. With ownership of the network, old transactions may be manipulated and may open up the possibility of double spending/double tolling the asset. To avoid this, a safeguard mechanism may be introduced.

Figure 11:
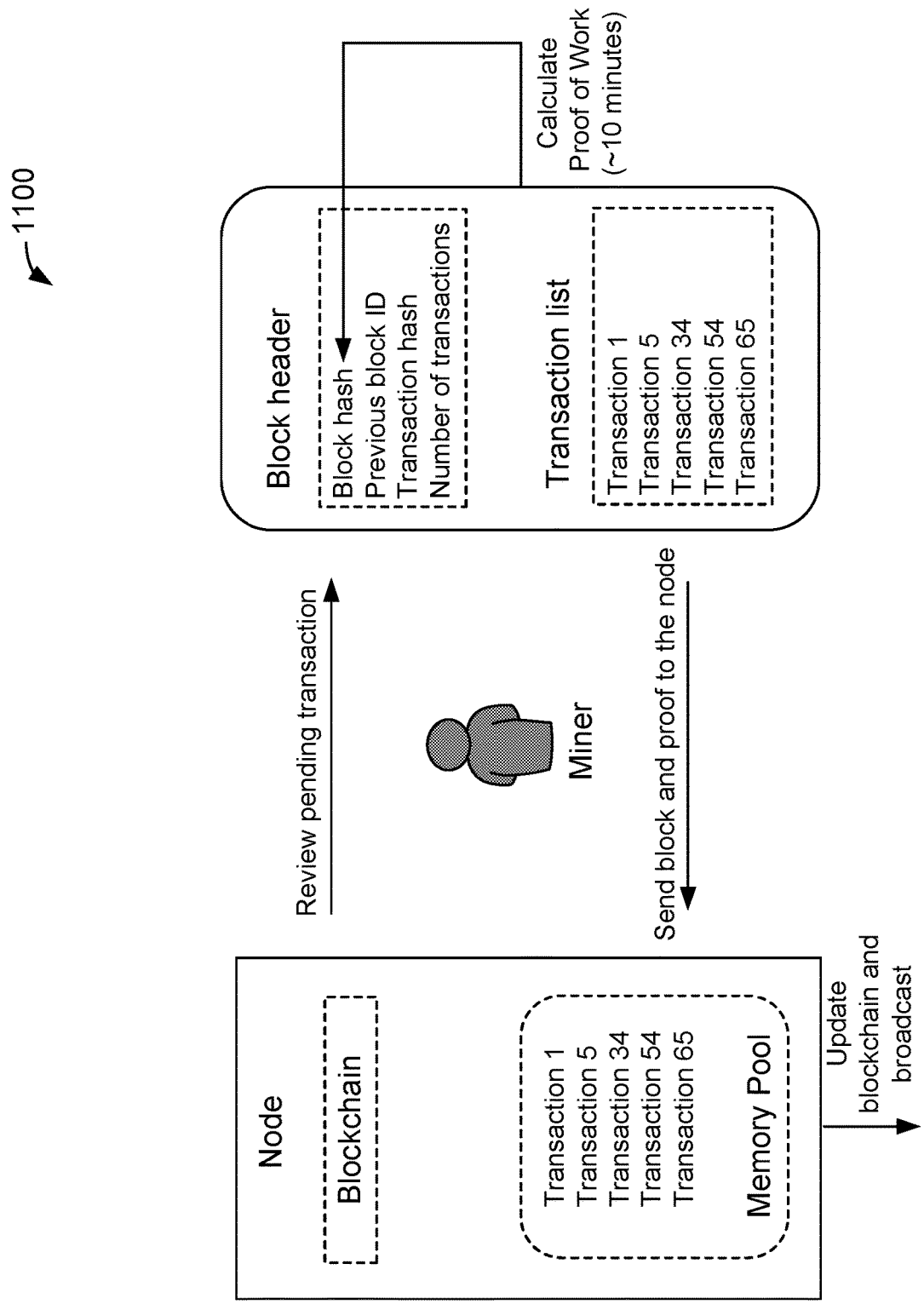
FIG. 11 illustrates an example of securely conducting digital transactions with blockchain using Proof of Work (PoW) in accordance with various embodiments.

FIG. 11 illustrates an example 1100 of securely conducting digital transactions with blockchain using Proof of Work (PoW) in accordance with various embodiments. A Proof of Work (PoW) may be a small mathematical problem each of the miners, acting on the blockchain, has to solve before sending or adding a block to a node. The PoW may be designed in order to take the miners time (e.g., an average of 10 minutes) and computing power to compute. Using such a technique leads to a reduction of the possibility that a single entity controls a sufficiently large portion of the miners of a blockchain in order to subvert the blockchain's operation. Nonetheless, an entity can increase the computing power of a miner, and the system that the miner is using, in order to perform mining and to compute the PoW at a faster rate in order to gain greater control of the miners and the blockchain network. However, to reduce the effectiveness of such increase in computing power, the network may check how fast miners have computed the PoW for every set number of blocks (e.g., 2016 blocks) created/added in the blockchain. The network may then adjust the difficulty of the PoW computation necessary in order to help prevent entities and miners that they may control from tipping the balance of control simply by adding additional computing power.

Examples of Digital Assets Include the Following:

Composition Blockchain Asset (e.g., Composition Intellectual Property Rights):

| | | |
|---|---|---|
| Composition Database ID | | MB2344230909 |
| Work name | | Fall Back 2U |
| Songwriter(s) | David Macklovitch | Nettwerk One Music |
| | Patrick Gemayel | Nettwerk One Music |
| ISWC | <ISWC> | |
| Date/Time ingested, updated or taken down | 13:37:49, 05/12/2014 | |
| Territory | | CA, FR, UK, US |

Recording Blockchain Asset (e.g., Recording Intellectual Property Rights License):

| | | |
|---|---|---|
| Recording Database ID | | MB2344230909 |
| Song name | | Fall Back 2U |
| Artist | | Chromeo |
| Album | | White Woman |
| Genre | | Electro-Funk |
| ISRC | | USAT21400507 |
| UPC | | <UPC> |
| Date/Time ingested, updated or taken down | | 13:37:49, 05/12/2014 |
| Label | | Big Beat Records |
| Territory | | US |
| License type (streaming, download or physical) | | Streaming |
| Compositions | David Macklovitch | Nettwerk One Music |
| | Patrick Gemayel | Nettwerk One Music |

Mix Blockchain Asset:

| | | | |
|---|---|---|---|
| Mix Database ID | | MB373886945 | |
| ISRC | | USWE342554 | |
| Name | | MMix | |
| Original release date | | 2015 Jun. 11 | |
| Genre | | Electro-Funk | |
| Style | | Electronica/Dance | |
| Status (cleared, pending or blocked) | | Cleared | |
| Date/Time submitted | | 19:24:51, 1/15/2015 | |
| Date/Time cleared | | 20:05:37, 1/15/2015 | |
| Allowed Digital Streaming Platform (DSPs) | Spotify | 20:05:37, 1/15/2015 | Subscriptio - Stand alone |
| | Rhapsody | 20:05:37, 1/15/2015 | Pay As You Go |
| Cleared Territories | US | 20:05:37, 1/15/2015 | Subscription - Stand alone |
| | US | 20:05:37, 1/15/2015 | Pay As You Go |
| Song segments | MB2344230909 | PT0M00S | PT1M16S |
| | MB2344465465 | PT1M16S | PT2M45S |

-continued

|  |  |  |
|---|---|---|
| MB2348475665 | PT2M47S | PT4M00S |
| MB2349483726 | PT4M00S | PT4M59S |
| MB234475847 | PT5M00S | PT6M36S |
| MB239584732 | PT6M44S | PT8M10S |
| MB231948372 | PT8M18S | PT9M44S |
| MB239584958 | PT9M45S | PT12M31S |

Distribution Blockchain Asset (e.g., Distribution Intellectual Property Rights):

| Mixes | MB373886945 | Spotify | 090:05:37, 1/20/2015 | Subscription - Stand alone | US |
|---|---|---|---|---|---|
|  |  | . . . |  |  |  |
|  |  | Rhapsody | 08:26:18, 1/20/2015 | Pay As You Go | US |
|  | . . . |  |  |  |  |
|  | <Mix n> | <DSP 1> | <Date/Time delivered, updated or taken down> | <Subscription types> | <Territory> |
|  |  | . . . |  |  |  |
|  |  | <DSP n> | <Date/Time delivered, updated or taken down> | <Subscription types> | <Territory> |

Royalty Payment Report Blockchain Asset:

| Labels | <DSP 1> | <Song 1> | <Amount paid> | <Total time played> | <Territory> | <Subscription type> | <Date/Time royalty paid> |
|---|---|---|---|---|---|---|---|
|  |  | . . . |  |  |  |  |  |
|  |  | <Song n> | <Amount paid> | <Total time played> | <Territory> | <Subscription type> | <Date/Time royalty paid> |
|  | <DSP n> | <Song 1> | <Amount paid> | <Total time played> | <Territory> | <Subscription type> | <Date/Time royalty paid> |
|  |  | . . . |  |  |  |  |  |
|  |  | <Song n> | <Amount paid> | <Total time played> | <Territory> | <Subscription type> | <Date/Time royalty paid> |
| Publishers | <DSP 1> | <Composition 1> | <Amount paid> | <Total time played> | <Territory> | <Subscription type> | <Date/Time royalty paid> |
|  |  | . . . |  |  |  |  |  |
|  |  | <Composition n> | <Amount paid> | <Total time played> | <Territory> | <Subscription type> | <Date/Time royalty paid> |
|  | <DSP n> | <Composition 1> | <Amount paid> | <Total time played> | <Territory> | <Subscription type> | <Date/Time royalty paid> |
|  |  | . . . |  |  |  |  |  |
|  |  | <Composition n> | <Amount paid> | <Total time played> | <Territory> | <Subscription type> | <Date/Time royalty paid> |

Usage Report Blockchain Asset:

| DSPs | <Mix 1> | <Start position> | <End position> | <Date/Time played> | <Territory> | Subscription type |
|---|---|---|---|---|---|---|
|  | <Mix 1> | <Start position> | <End position> | <Date/Time played> | <Territory> | Subscription type |
|  | . . . |  |  |  |  |  |
|  | <Mix n> | <Start position> | <End position> | <Date/Time played> | <Territory> | Subscription type |

Figure 12:
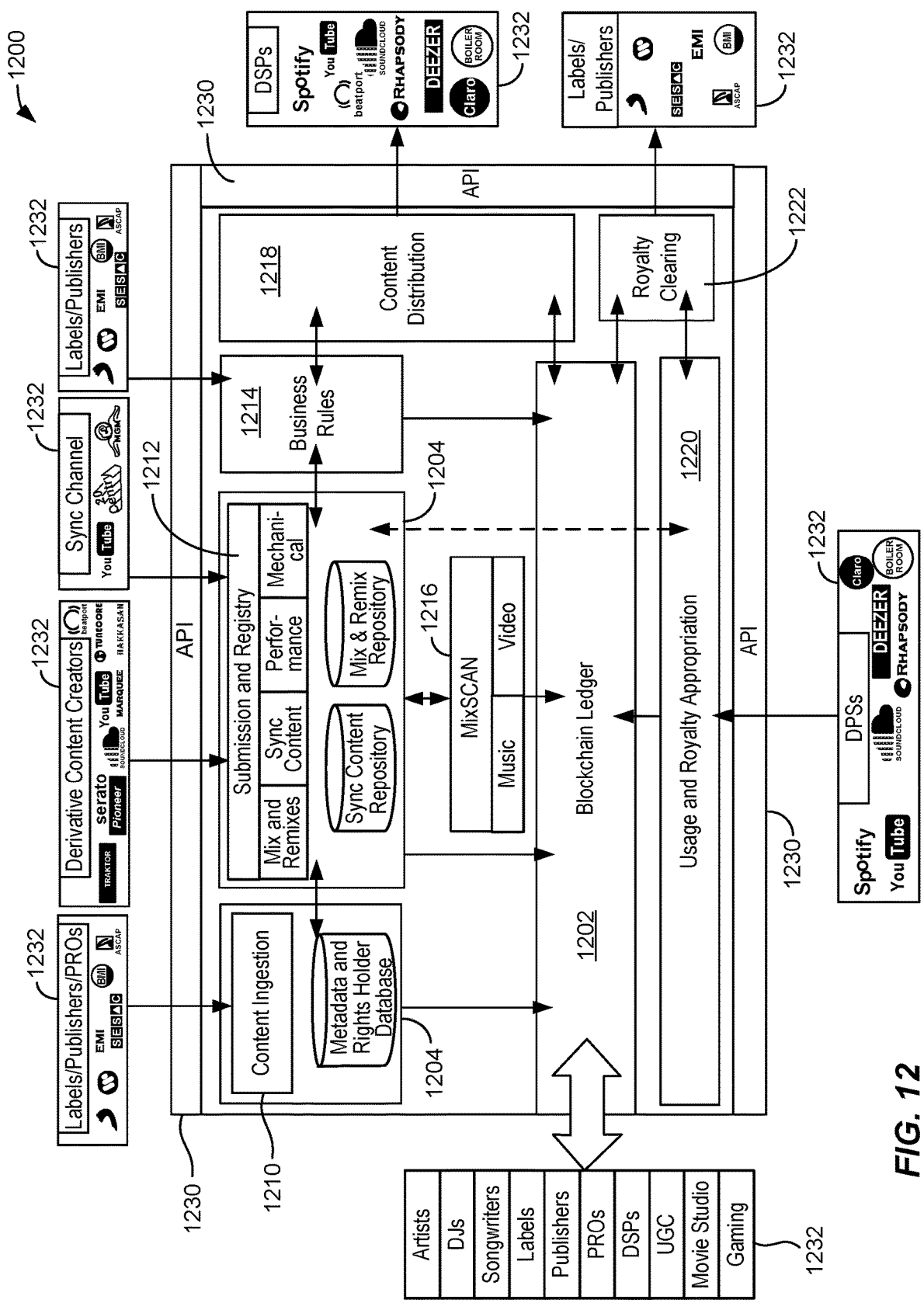
FIG. 12 illustrates an example system for conducting digital transactions using a blockchain in accordance with various embodiments.

FIG. 12 illustrates an example system 1200 for conducting digital transactions using a blockchain in accordance with various embodiments. In addition, FIG. 12 shows the use of blockchain assets and wallets 1202 in accordance with various embodiments. As shown in FIG. 12, the media content processing system 1200 may include one or more media content databases 1204 that may be implemented as a platform, including several modules. System 1200, and the platform may be enabled with modules comprising code executable by a processor to perform the various functions. These functions may be embodied in components including rights ownership content ingestion components 1210, submission of media content (UGC) components 1212, business rules creation components 1214, media content clearance using media content processing and business rules components 1216, media content distribution components 1218, usage and royalty reporting components 1220, and royalty payment components 1222. The components may be accessed using various application programming interfaces (APIs) 1230 by any number of different users 1232.

A single blockchain 1202 may be set up as an integral part of a media content processing system 1200 according to various embodiments. The media content processing system 1200 may span across multiple private or public nodes (e.g., distributed servers) in the peer-to-peer network. The media content processing system 1200 may provide access to one or more media content databases 1204 having one or more application programming interface (API) layers 1206 operating as a part or in conjunction with the database(s) and/or media content processing system. To ensure that private information may not be inappropriately shared, the media content database(s) may securely store any data that they contain, and as a result, the database(s) may include ownership and privilege information for all objects represented within. The media content database(s) may also include linked blockchain assets (as a part of one or more blockchains) and digital wallet information 1202 (associated with various users and/or media content rights holders).

According to various embodiments, the techniques as disclosed herein, of using one or more blockchains to support a media content processing system, may be based on rights ownership information in the one or more media content databases or a media content bank (which may be a part of the media content database(s), and which may include multiple assets related to media content). The media rights ownership information and/or media related assets may be represented using one or more blockchains and/or blockchain wallets 1202. Such blockchains and/or wallets may be used by media content service providers, such as publishers and record labels. One or more blockchains and/or wallets may additionally be used to track transactions related to one or more assets (e.g., licenses for one or both of the composition intellectual property rights and the recording intellectual property rights) for each track/title of media for which a segment is used in UGC (such as media content including mixes and/or remixes). Each asset and/or asset transaction represented in a blockchain may be represented by a unique asset ID, which may be included in the media content database(s) together with other information related to that asset and/or asset transaction.

When UGC media content (e.g., a mix/remix) is submitted into the media content processing system (using components 1210 and/or 1212), it may be processed by the system and stored in the media content database(s) 1204. The media content processing system may identify (using component 1216) one or more of the segments (e.g., portions) associated with media content (e.g., tracks/titles) within the UGC media content (e.g., mix/remix). The media content processing system may also include the start and end times of the identified segment(s) as well as possibly other information pertaining to the segment(s). The media content processing system may make such identification of segment(s) and related information using a fingerprinting technique, which may include for example, acoustic fingerprinting and textual fingerprinting on all segments (intervals or portions of media) within the UGC media content (as disclosed in U.S. patent application Ser. No. 16/288,857, filed Feb. 28, 2019, entitled "MEDIA CONTENT PROCESSING TECHNIQUES USING FINGERPRINTING AND HEURISTICS", which is hereby incorporated by reference herein in its entirety). Once the segment(s) are identified (using component 1216), the media content processing system may associate (using components 1216 and/or 1212) the segment(s) with one or more tracks/titles and/or one or more intellectual property rights and related assets (i.e., assets such as a license for a media composition or a license for a media recording in one or more blockchain(s) as described above). The UGC media content and/or identified segment(s) may also include metadata, such as information about the original audio file (e.g., MD5, SHA-1, etc.) used for the associated track/title. Such metadata and other information related to the identified segment(s) and/or the UGC media content may be stored in one or more media content database(s). In addition, a user, such as the user submitting the UGC media content to the media content processing system (e.g., a DJ), may have a digital wallet (e.g., such as 1202) in which the metadata, information related to any assets (including assets related to the UGC media), and other information may be created and stored.

Once the metadata, and other information related to the identified segment(s) and/or the UGC media content is known, the recordings and compositions may be checked against multiple business rules set by the rights holders of the intellectual property rights associated with the identified segment(s) (using components 1214). Such rules may include usage business rules, distribution business rules, and/or other rules pertaining to the intellectual property rights associated with the identified segment(s) or the monetization of such rights (e.g., licenses). Business rules may be captured and stored in the media content database(s). In addition, these rules and/or the implicated and associated rights may be captured as blockchain assets in the digital wallets of media content rights holders, such as the publisher of the media content and the label associated with the media content. UGC content and/or included media content within the UGC content, that clear the business rules (i.e., those that are validated as following/meeting the business rules) and/or match rate validation may then be allowed to be distributed (using component 1218) to Digital Streaming Providers (DSPs). Mixes that are blocked due to a business rule or due to match rate validation may be marked as blocked. Mix status (such as cleared, blocked, taken down, among other such statuses) may be transactions that may be captured in the user's (e.g., DJ's) digital wallet.

Business rules may be set by the rights holders of intellectual property rights associated with any media content. Such business rules may include rules that allow for blacklisting an artist or a song, accepting or rejecting a DSP, etc. Business rules may also be set by the other users (e.g., DJs) when the user chooses to which DSP(s) the user allows mixes to be distributed. Business rules may also be set by the DSPs when the DSP provides program information to the rights holders, or other users (e.g., DJs) to accept or decline.

These transactions may be registered in the respective digital wallets of the rights holders and/or other users.

Distribution or takedown of media content may also be transactions captured in the digital wallets associated with the DSP and/or other users. Similarly, the digital wallets of rights holders such as the wallets of labels and/or publishes may be updated to record a transaction involving an intellectual property right and/or one or more assets associated the rights holders' media content (e.g., recording and/or a composition being distributed as part of the UGC media content such as a mix/remix).

DSPs may report (using component 1220) listening history (e.g., via a report sent to the media content processing system). The report may be associated with one or more assets included on one or more blockchains as described herein. The report of the listening history may be used to update one or more digital wallets, including the digital wallets of the label, the publisher, the users (e.g., the DJ), and/or the DSPs. Listening history may also be translated (using component 1222) into royalties and/or other payments related to the UGC content and stored in the respective digital wallets of the users.

Figure 13:
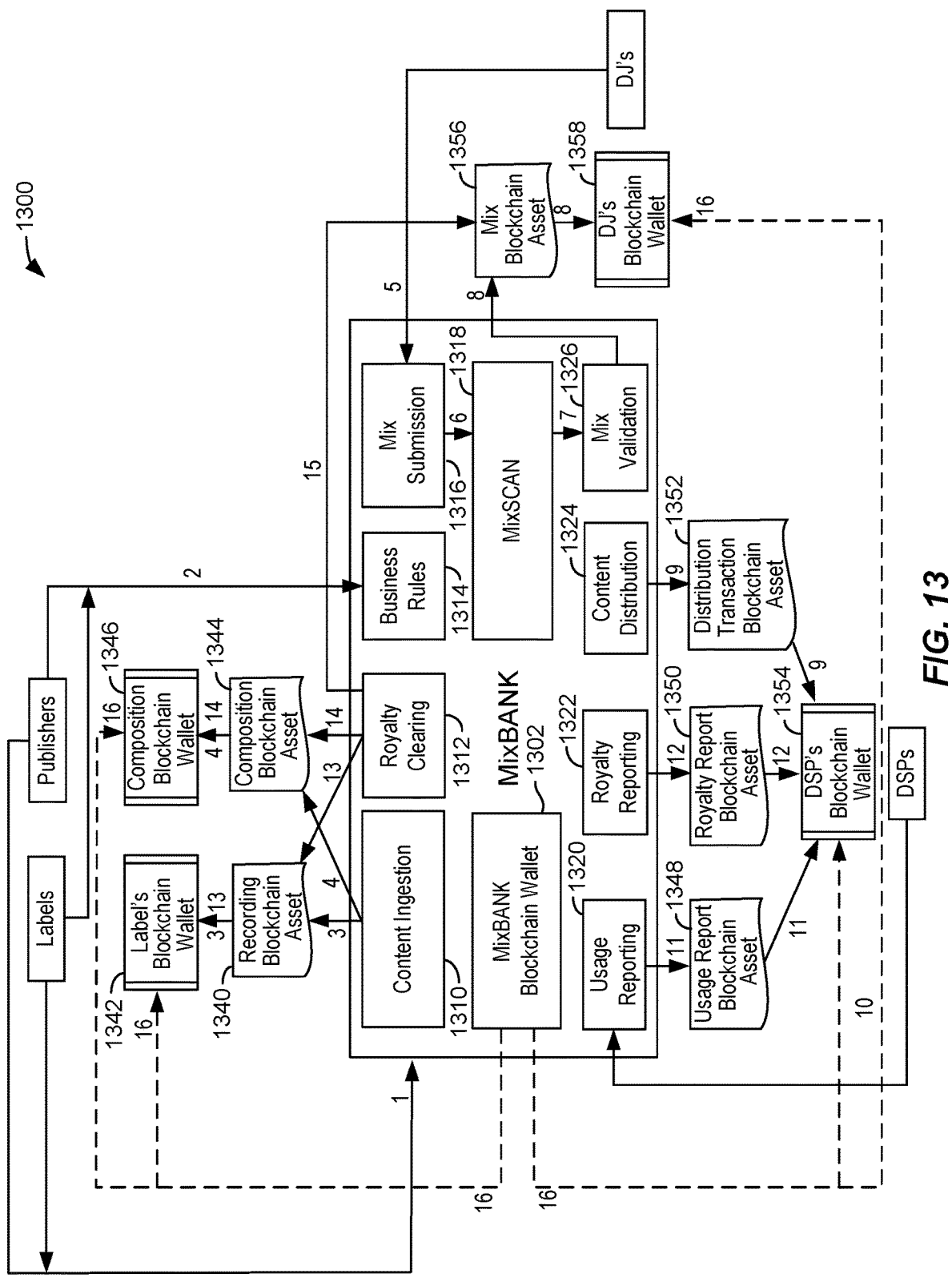
FIG. 13 illustrates an example system for conducting digital transactions using a blockchain in accordance with various embodiments.

FIG. 13 illustrates an example system 1300 for conducting digital transactions using blockchain in accordance with various embodiments. In addition, FIG. 13 shows the use of blockchain assets and wallets in accordance with various embodiments. Records of assets related to any media content may be created and stored in one or more blockchains (which records transactions associated with the assets). The digital wallets of the owners/rights holders, associated with the assets, may be updated to reflect ownership and/or the transactions. The blockchain assets and wallets may be updated based on various transactions within the media content processing system and/or media content database(s). Any information associated with any UGC media content may be ingested into the media content processing system and media content database(s), and the creation/storage of and/or updates to various blockchain assets and wallets of the respective rights holders may be triggered. As shown in FIG. 13, the media content processing system 1300 may include one or more media content databases that may be implemented as a platform, including several modules. System 1300, and the platform may be enabled with modules comprising code executable by a processor to perform the various functions. These functions may be embodied in components including content ingestion components 1310, royalty clearing/payment components 1312, business rules creation components 1314, mix submission components 1316, media content processing components 1318, media usage reporting components 1320, royalty reporting components 1322, content distribution components 1324, and mix validation components 1326. Additionally, system 1300 may include one or more blockchains with one or more blockchain wallets 1302 which include: one or more recording blockchain assets 1340 and label's blockchain wallet 1342, one or more composition blockchain assets 1344, and publisher's blockchain wallet 1346, one or more usage report blockchain assets 1348, one or more royalty report blockchain assets 1350, one or more distribution transactions blockchain assets 1352, and DSP's blockchain wallet 1354, one or more mix blockchain assets 1356, and DJ's blockchain wallet 1358.

When UGC media content (e.g., a mix/remix) is submitted into the media content processing system (using components 1310 and/or 1316), it may be processed by the system and stored in the media content database(s). The media content processing system may identify (using component 1318) one or more of the segments (e.g., portions) associated with media content (e.g., tracks/titles) within the UGC media content (e.g., mix/remix). The media content processing system may also include the start and end times of the identified segment(s) as well as possibly other information pertaining to the segment(s). The media content processing system may make such identification of segment(s) and related information using a fingerprinting technique, which may include, for example, acoustic fingerprinting and textual fingerprinting on all segments (intervals of media) within the UGC media content. Once the segment(s) are identified (using component 1318), the media content processing system may associate (using components 1310, 1316, and/or 1318) the segment(s) with one or more tracks/titles and/or one or more intellectual property rights and related assets (i.e., assets such as a license for a media composition or a media recording in one or more blockchain(s) as described above). As such, one or more recording blockchain assets 1340 as well as one or more composition blockchain assets 1344 may be created or updated to reflect transactions as associated with the rights to the newly identified segment(s). The label's blockchain wallet 1342 and publisher's blockchain wallet 1346 may also be updated to reflect ownership of those rights.

Once information related to the identified segment(s) and/or the UGC media content is known, the associated recordings and compositions may be checked against multiple business rules set by the rights holders of the rights associated with the identified segment(s) (using components 1314). Such rules may include usage business rules, distribution business rules, and/or other rules pertaining to the intellectual property rights associated with the identified segment(s) or the monetization of such rights (e.g., licenses). Business rules may be captured and stored in the media content database(s). UGC content and included media content within the UGC content that clear the business rules (i.e., those that are validated as following/meeting the business rules) and/or match rate validation may then be allowed to be distributed (using component 1324) to DSPs. This may trigger the creation or updating of the distribution transactions blockchain asset(s) 1352, to reflect that UGC content is available for distribution. This may also trigger the updating of the DSP's blockchain wallet 1354. In addition, the validation of UGC content may trigger (using component 1326) the creation or updating of mix blockchain asset(s) 1356 with a transaction that is indicative of the rights associated with the validated UGC content. These may also trigger the updating of the DJ's blockchain wallet 1358 to reflect ownership of the UGC content by the DJ. DSPs may report listening/usage history as well as royalties owed (e.g., via reports pertaining to the UGC media content listened to or used by DSP users) to the media content processing system. The media content processing system may trigger (using component 1320) the creation or updating of the usage report blockchain asset(s) 1348 based on the reports, and may also trigger (using component 1322) the creation or updating of the royalty report blockchain asset(s) 1350. These may also trigger the updating of the DSP's blockchain wallet 1354. Listening/usage history may also be translated into royalties and/or other payments related to the UGC content and (using component 1312) the recording blockchain asset(s) 1340 may be updated (triggering the update of the label's blockchain wallet 1342) and composition blockchain asset(s) 1344 may be updated (triggering the update of the publisher's blockchain wallet 1346) to reflect the respective royalty payments to the respective rights holders.

Figure 14:
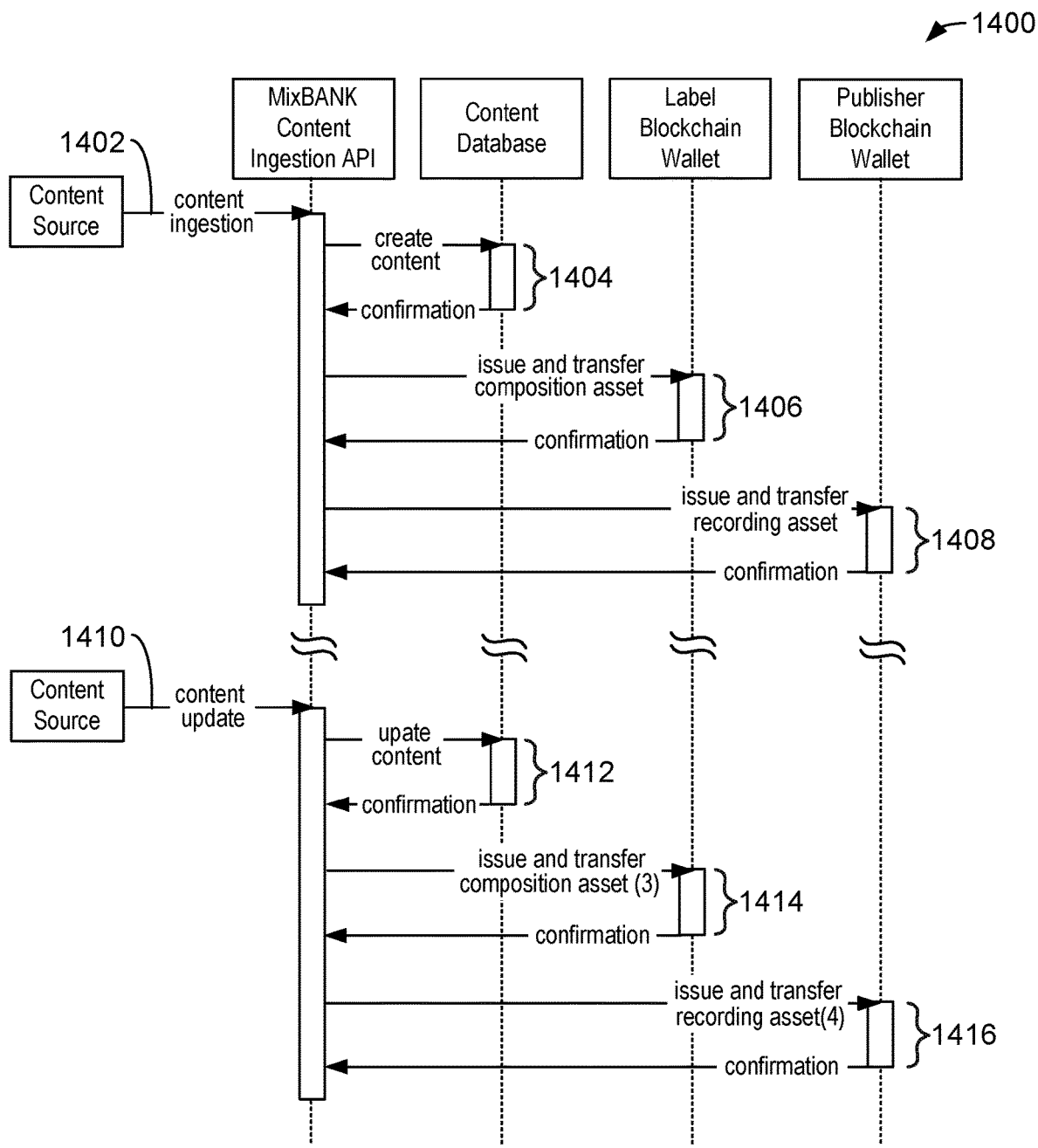
FIG. 14 illustrates an example flow diagram of techniques for creating assets associated with media content in accordance with various embodiments.

FIG. 14 illustrates an example flow diagram 1400 of techniques for creating assets associated with media content in accordance with various embodiments. At 1402, UGC media content may be sent to/received by the media content processing system and/or an API, associated with content ingestion, at the media content processing system. At 1404, a record of the media content may be created and the content may be stored in one or more media content databases. Confirmation may also be sent to the media content processing system and/or API. The media content may be analyzed using fingerprinting techniques to identify one or more segments of the media content found in the media content database(s). The identified segment(s) may be used to identify the intellectual property rights and rights holders associated with the segment(s). At 1406, the creation or storage of media content in the media content database(s) may lead to the issue and transfer of a first intellectual property right asset (e.g., composition rights asset) to a first blockchain digital wallet (e.g., of the label) and/or to a first blockchain (which records the asset in transaction(s) within its blocks). A confirmation may be sent to the media content processing system. The type of the first intellectual property right asset (e.g., related to the composition of the media content) may be determined based on the identified one or more segments of the media content. At 1408, the creation or storage of media content in the media content database(s) may lead to the issue and transfer of a second intellectual property right asset (e.g., recording rights asset) to a second blockchain digital wallet (e.g., of the publisher) and/or to a second blockchain (which records the asset in transaction(s) within its blocks). A confirmation may be sent to the media content processing system. The type of the second intellectual property right asset (e.g., related to the recording of the media content) may be determined based on the identified one or more segments of the media content.

At 1410, UGC media content may be updated via the media content processing system and/or an API, associated with content ingestion, at the media content processing system. At 1412, a record of the updated media content may be created and the updated content may be stored in one or more media content databases. Confirmation may also be sent to the media content processing system and/or API. The updated media content may be analyzed using fingerprinting techniques to identify one or more segments of the updated media content found in the media content database(s). The identified segment(s) may be used to identify the intellectual property rights holders associated with the segment(s). At 1414, the update of media content in the media content database(s) may lead to the issue and transfer of a first intellectual property right asset (e.g., composition rights asset) to a first blockchain digital wallet (e.g., of the label) and/or to a first blockchain (that records the asset in transaction(s) within its blocks). A confirmation may be sent to the media content processing system. The type of the first intellectual property right asset (e.g., related to the composition of the media content) may be determined based on the identified one or more segments of the media content. At 1416, the update of media content in the media content database(s) may lead to the issue and transfer of a second intellectual property right asset (e.g., recording rights asset) to a second blockchain digital wallet (e.g., of the publisher) and/or to a second blockchain (that records the asset in transaction(s) within its blocks). A confirmation may be sent to the media content processing system. The type of the second intellectual property right (e.g., related to the recording of the media content) asset may be determined based on the identified one or more segments of the media content.

Prior to or after the issue and transfer of any intellectual property rights assets, rules may be created to aid in the distribution of the media content (e.g., UGC), and/or to capture transactions related to the media content in one or more blockchain digital wallets (e.g., of a DSP).

Figure 15:
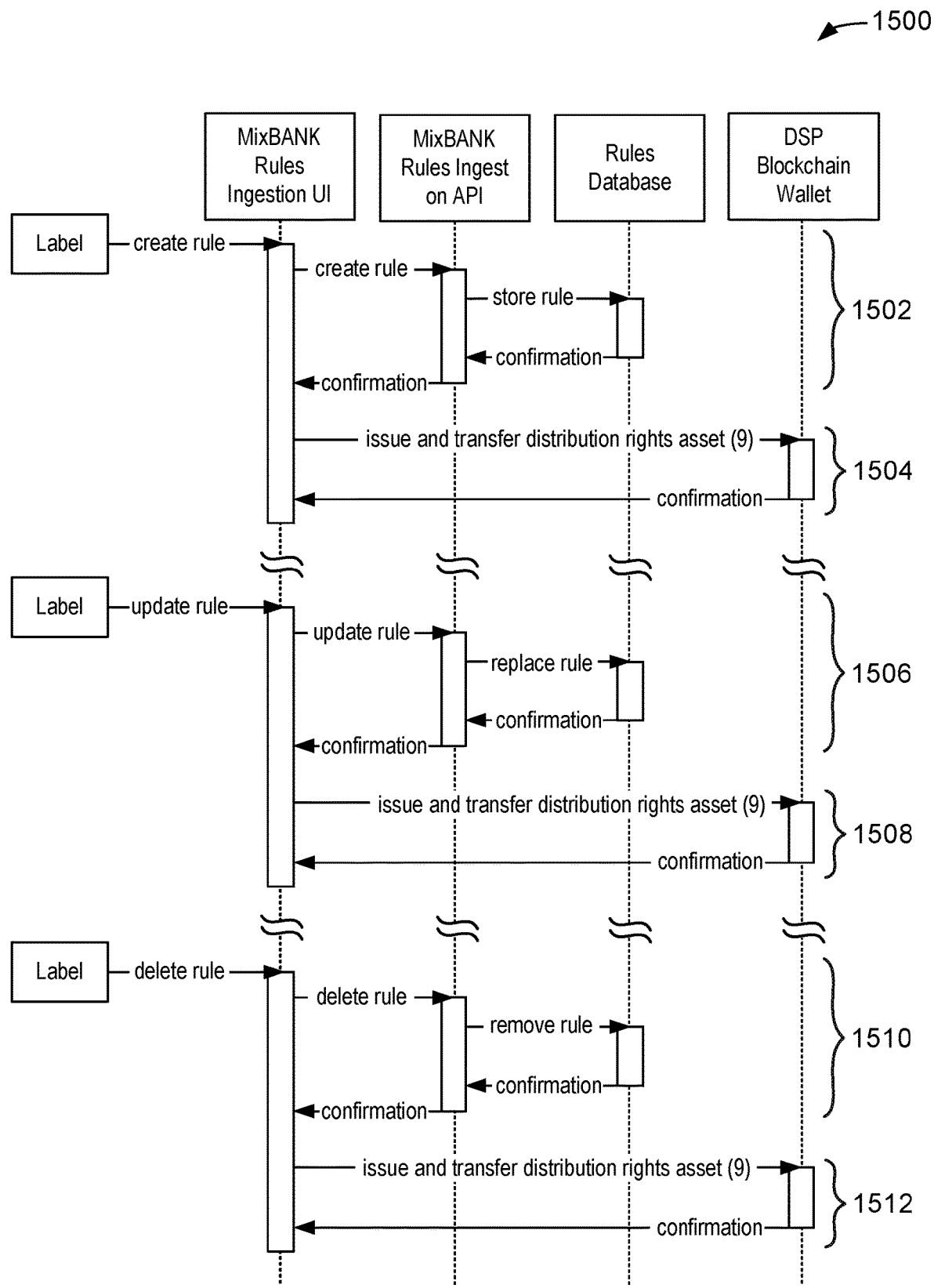
FIG. 15 illustrates an example flow diagram of techniques for managing rules associated with segments in the media content in accordance with various embodiments.

FIG. 15 illustrates an example flow diagram 1500 of techniques for managing rules associated with segments in the media content in accordance with various embodiments. The media content processing system may perform rule ingestion to create rules and apply the rules in order to determine what asset rights (e.g., copyrights, licensing rights: composition, recording, performance, etc.) are associated with the segments of media content. In some embodiments, the media content processing system may create and maintain its own centralized registry of media content and the associated rights holders. In other embodiments, the media content processing system may be operatively coupled to and in communication with an external entity having such a database of media content, for example, a governmental copyright database, or an independently operated database or media content provider (e.g., publishers, labels, etc.). At 1502, one or more rules may be created, and they may be stored by the media content processing system in the one or more media content databases, and/or the one or more rules databases. Such rules may be created using a rules user interface and an application programming interface (API), which may each be a part of the media content processing system. At 1504, the creation of rules may lead to the issue and transfer of an intellectual property right asset (e.g., distribution rights asset) to a blockchain digital wallet (e.g., of the DSP) and a confirmation may be sent to the rules user interface and/or the user. At 1506, one or more rules may be updated by using the media content processing system to replace such rules in the one or more media content databases, and/or the one or more rules databases. Such rules may be updated using a rules user interface and an application programming interface (API), which may each be a part of the media content processing system. At 1508, the updating of rules may lead to the issue and transfer of an intellectual property right asset (e.g., distribution rights asset) to a blockchain digital wallet (e.g., of the DSP) and a confirmation may be sent to the rules user interface and/or the user. At 1510, one or more rules may be deleted using the media content processing system to remove such rules from the one or more media content databases, and/or the one or more rules databases. Such rules may be deleted using a rules user interface and an application programming interface (API), which may each be a part of the media content processing system. At 1512, the deleting of rules may lead to the issue and transfer of an intellectual property right asset (e.g., distribution rights asset) to a blockchain digital wallet (e.g., of the DSP) and a confirmation may be sent to the rules user interface and/or the user. Business rules may be applied to UGC media content (including the mixes/remixes, but also the segments within the mixes/remixes as identified by the media content processing system) in order to perform media content validation for distribution clearance of the UGC media content against the business rules. For example, the business rules may pertain to the use and/or the distribution of the media content and/or the segments. The transactions may be captured, recorded, and stored in a user's blockchain digital wallet, for example.

Figure 16:
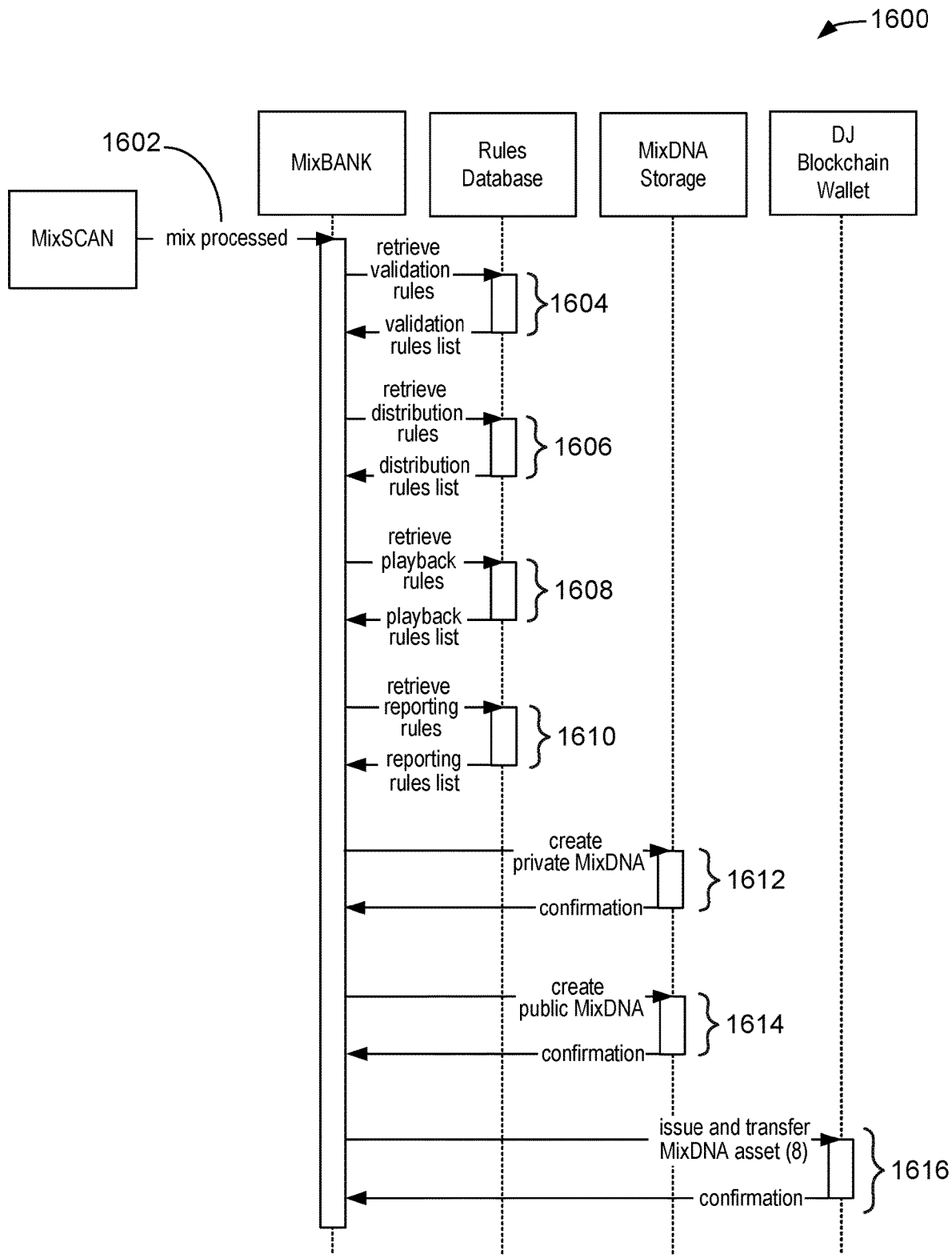
FIG. 16 illustrates an example flow diagram of techniques for processing segments in media content in accordance with various embodiments.

FIG. 16 illustrates an example flow diagram 1600 of techniques for processing segments in media content in accordance with various embodiments. The media content processing system may perform a mix validation and clearance, in which the segments in the UGC media content are validated and cleared for the user to use within the UGC media content (e.g., mix/remix). In some embodiments, a user may submit a proposed list of existing media content (e.g., tracks/titles belonging to another rights holder) of which the user intends to use segments within his or her media content (e.g., mix/remix). As such, clearance may be performed before creation or use of such segments of media content (e.g., tracks/titles belonging to another rights holder). For example, a DJ may submit to the media content processing system a proposed list of tracks or songs that the DJ intends to use in a mix or remix. The media content processing system may then run a clearance first on the tracks and even provide a licensing estimate for the DJ to review prior to creating the mix/remix or uploading media content to the media content processing system. As such, the user may modify which segments of media content (e.g., song tracks/titles) to use in creating his or her own UGC media content.

Alternatively, clearance may be performed after a user has uploaded the media content to the media content processing system but before distribution. The media content may be cleared for distribution upon the user approving and paying an asset estimate (e.g., licensing or royalty payment plan). For example, a DJ may upload a mix that uses segments from a number of tracks. The media content processing system may identify the rights holders of all the tracks used in the mix, determine which tracks are cleared and the associated licensing fees, and then notify the user. In some cases, the media content processing may identify the tracks that were not cleared to the DJ.

In flow diagram 1600, at 1602, an uploaded mix/remix may be processed by the media content processing system to produce normalized metadata (pertaining to the tracks/titles used in the mix/remix), which may be transmitted to one or more of the other components of the media content processing system. At 1604, the media content processing system may request, from one or more rules databases (which may be portions of the one or more media content databases or separate entities), validation rules and may receive from the database(s) a validation rules list. At 1606, the media content processing system may request, from one or more rules databases, distribution rules and may receive from the database(s) a distribution rules list. At 1608, the media content processing system may request, from one or more rules databases, playback rules and may receive from the database(s) a playback rules list. At 1610, the media content processing system may request, from one or more rules databases, reporting rules and may receive from the database(s) a reporting rules list. The validation, distribution, playback, and reporting rules lists may be used to determine the appropriate use of, and payment for, the tracks/titles used in the mix/remix. At 1612, the media content processing system may request, from the media content database(s), the creation of private metadata, which includes the various rules lists, and which pertains to the uploaded mix/remix. It may also receive confirmation of the creation of such private metadata. At 1614, the media content processing system may request, from the media content database(s), the creation of public metadata, which includes the various rules lists, and which pertains to the uploaded mix/remix. It may also receive confirmation of the creation of such public metadata. At 1616, the creation of private and/or public metadata may lead to the issue and transfer of an asset related to the metadata (i.e., an asset related to the mix/remix) to a blockchain digital wallet (e.g., of the DJ) and a confirmation may be sent to the media content processing system. Once mixes/remixes are distributed, DSPs may capture the usage/consumption data. This data may then reported and transmitted to the media content processing system and/or the media content database(s) to create usage reports, to calculate royalties, and to pay the rights holders and other users (e.g., the DJs). As shown in FIG. 16, metadata may be stored in the digital wallets of various users and these digital wallets may be updated based on the transactions related to the calculated royalties.

As discussed above, the various embodiments can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, a Bluetooth wireless technology device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for processing media content, comprising:

receiving, at a media processing server, media content from a source, the media content being user-generated and including derivative works of existing media content;

identifying, based at least in part on a finger printing system that analyses one or more of an acoustic or a textual property of the media content, one or more segments of the media content using a content database, the one or more segments associated with different rights holders;

determining, based at least in part on the finger printing system and the content database, a first type of asset for the one or more segments of the media content, the first type of asset corresponding to a first rights holder, and the first type of asset associated with a first right of a set of rights less than a full set of rights for the one or more segments of the media content;

determining, based at least in part on the finger printing system and the content database, a second type of asset for the one or more segments of the media content, the second type of asset corresponding to a second rights holder, the second type of asset associated with a second right of the set of rights less than the full set of rights for the one or more segments of the media content, and the first right being different from the second right;

determining, for a mixed asset including the first type of asset and the second type of asset, an estimate associated with a cost for incorporating the first type of asset and the second type of asset into the mixed asset;

receiving confirmation, from the source of the media content, associated with the mixed asset corresponding to an acceptance of the estimate associated with the cost;

determining, for the first rights holder, an associated address for a first rights holder wallet in one or more blockchains;

transferring the first type of asset, from the media processing server, to a first linked ledger as a first digital token including both the first type of asset and a first private key, the first type of asset immutably stored on one or more blocks of the first linked ledger corresponding to the first rights holder wallet authenticated using a first public key corresponding to the associated address for the first rights holder wallet, wherein the first private key and the first public key are part of a first key-pair generated for the first digital token;

determining, for the second rights holder, an associated address for a second rights holder wallet in the one or more blockchains;

transferring the second type of asset, from the media content processing server, to a second linked ledger as a second digital token including both the second type of asset and a second private key, the second type of asset immutably stored on one or more blocks of the second linked ledger corresponding to the second rights holder wallet authenticated using a second public key corresponding to the associated address for the second rights holder wallet, wherein the second private key and the second public key are part of a second key-pair generated for the second digital token;

providing confirmation of the first type of asset stored on the first linked ledger and the second type of asset stored on the second linked ledger;

creating the mixed asset including the first type of asset, the second type of asset, and metadata for the mixed asset, the metadata including a combination of private metadata and public metadata associated with one or more rules set by the source of the media content for the mixed asset, the private metadata including a first set of rules accessible by a restricted set of users authorized to access the first set of rules and the public metadata including a second set of rules, and at least a portion of the first set of rules is different from at least a portion of the second set of rules;

transferring the mixed asset, from the media content processing server, to a third linked ledger as a third digital token including both the mixed asset and a third private key, the mixed asset immutably stored on one or more blocks of the third linked ledger authenticated using a third public key corresponding to an associated address for the third linked ledger, wherein the third private key and the third public key are part of a third key-pair generated for the third digital token;

providing confirmation of the mixed asset stored on the third linked ledger;

determining usage of the mixed asset in accordance with the one or more rules associated with the metadata in the third digital token, based on captured usage and consumption data of the mixed asset recorded by a digital streaming provider;

identifying the respective associated addresses for the first type of asset in the first digital token stored in the first linked ledger and the second type of asset in the second digital token stored in the second linked ledger; and updating the one or more blocks for the first type of asset stored on the first linked ledger and the one or more blocks for the second type of asset stored on the second linked ledger based, at least, on the usage of the mixed asset recorded by the digital streaming provider.

2. The computer-implemented method of claim 1, wherein the first type of asset is a composition asset of the media content and the second type of asset is a recording asset of the media content.

3. The computer-implemented method of claim 1, wherein the first linked ledger and the second linked ledger are blockchains.

4. The computer-implemented method of claim 1, further comprising:
creating, for the one or more segments of media content, rules via an application programming interface (API);
storing the rules in the content database; and
validating the one or more segments of media content using the rules.

5. The computer-implemented method of claim 4, wherein the rules are at least one of a use business rule and a distribution business rule.

6. The computer-implemented method of claim 1, wherein the first type of asset is associated with a media label and the second type of asset is associated with a media publisher.

7. The computer-implemented method of claim 1, wherein the first type of asset and the second type of asset are associated with intellectual property rights.

8. The computer-implemented method of claim 1, wherein the one or more blocks of the first linked ledger and the one or more blocks of the second linked ledger make use of at least one pair of public-private cryptographic keys to sign and verify transactions associated with the respective tokens.

9. A system, comprising:
a media processing server;
a fingerprinting system;
one or more content databases;
a first linked ledger;
a second linked ledger;
a third linked ledger;
at least one processor; and
memory storing instructions that, when executed by the at least one processor, cause the system to:
receive, at the media processing server, media content from the source, the media content being user-generated and including derivative works of existing media content;
identify, based at least in part on the finger printing system that analyses one or more of an acoustic or a textual property of the media content, one or more segments of the media content using one or more content databases, the one or more segments associated with different rights holders;
determine, based at least in part on the finger printing system and the one or more content databases, a first type of asset for the one or more segments of the media content, the first type of asset corresponding to a first rights holder, and the first type of asset associated with a first right of a set of rights less than a full set of rights for the one or more segments of the media content;
determine, based at least in part on the finger printing system and the one or more content databases, a second type of asset for the one or more segments of the media content, the second type of asset corresponding to a second rights holder, the second type of asset associated with a second right of the set of rights less than the full set of rights for the one or more segments of the media content, and the first right being different from the second right;
determine, for a mixed asset including the first type of asset and the second type of asset, an estimate associated with a cost for incorporating the first type of asset and the second type of asset into the mixed asset;
receive confirmation, from the source of the media content, associated with the mixed asset corresponding to an acceptance of the estimate associated with the cost;
determine, for the first rights holder, an associated address for a first rights holder wallet in one or more blockchains;
transfer the first type of asset, from the media processing server, to the first linked ledger as a first digital token including both the first type of asset and a first private key, the first type of asset immutably stored on one or more blocks of the first linked ledger corresponding to the first rights holder wallet authenticated using a first public key corresponding to the associated address for the first rights holder wallet, wherein the first private key and the first public key are part of a first key-pair generated for the first digital token;
determine, for the second rights holder, an associated address for a second rights holder wallet in the one or more blockchains;
transfer the second type of asset, from the media content processing server, to the second linked ledger as a second digital token including both the second type of asset and a second private key, the second type of asset immutably stored on one or more blocks of the second linked ledger corresponding to the second rights holder wallet authenticated using a second public key corresponding to the associated address for the second rights holder wallet, wherein the second private key and the second public key are part of a second key-pair generated for the second digital token;

provide confirmation of the first type of asset stored on the first linked ledger and the second type of asset stored on the second linked ledger;

create the mixed asset including the first type of asset, the second type of asset, and metadata for the mixed asset, the metadata including a combination of private metadata and public metadata associated with one or more rules set by the source of the media content for the mixed asset, the private metadata including a first set of rules accessible by a restricted set of users authorized to access the first set of rules and the public metadata including a second set of rules, and at least a portion of the first set of rules is different from at least a portion of the second set of rules;

transfer the mixed asset, from the media content processing server, to the third linked ledger as a third digital token including both the mixed asset and a third private key, the mixed asset immutably stored on one or more blocks of the third linked ledger authenticated using a third public key corresponding to an associated address for the third linked ledger, wherein the third private key and the third public key are part of a third key-pair generated for the third digital token;

provide confirmation of the mixed asset stored on the third linked ledger;

determine usage of the mixed asset in accordance with the one or more rules associated with the metadata in the third digital token, based on captured usage and consumption data of the mixed asset recorded by a digital streaming provider;

identify the respective associated addresses for the first type of asset in the first digital token stored in the first linked ledger and the second type of asset in the second digital token stored in the second linked ledger; and update the one or more blocks for the first type of asset stored on the first linked ledger and the one or more blocks for the second type of asset stored on the second linked ledger based, at least, on the usage of the mixed asset recorded by the digital streaming provider.

10. The system of claim 9, wherein the first type of asset is a composition asset of the media content and the second type of asset is a recording asset of the media content.

11. The system of claim 9, wherein the first linked ledger and the second linked ledger are blockchains.

12. The system of claim 9, wherein the memory storing instructions that, when executed by the at least one processor, further cause the system to:
create, for the one or more segments of media content, rules via an application programming interface (API);
store the rules in the one or more content databases; and
validate the one or more segments of media content using the rules.

13. The system of claim 12, wherein the rules are at least one of a usage business rule and a distribution business rule.

14. The system of claim 9, wherein the first type of asset is associated with a media label and the second type of asset is associated with a media publisher.

15. The system of claim 9, wherein the first type of asset and the second type of asset are associated with intellectual property rights.

16. The system of claim 9, wherein the one or more blocks of the first linked ledger and the one or more blocks of the second linked ledger make use of at least one pair of public-private cryptographic keys to sign and verify transactions associated with the respective tokens.

17. A computer-implemented method for processing media content, comprising:
receiving media content from a source, the media content being user-generated and including derivative works of existing media content;
analyzing, via a finger printing system that identifies one or more of an acoustic or a textual property of the media content, the media content to identify portions of the media content associated with different rights holders;
determining, based at least in part on the finger printing system, at least one asset of a set of assets associated with the identified portions of the media content, the at least one asset having a rights holder different from a user associated with the source and different from at least one rights holder of another asset of the set of assets;
transferring information related to the at least one asset to a first digital wallet in one or more blockchains, the information being immutably stored within the first digital wallet as a first digital token including both the at least one asset and a first private key, wherein the first digital token is authenticated using a first public key corresponding to a first address of the first digital wallet, wherein the first private key and the first public key are part of a first key-pair generated for the first digital token;
creating a mixed asset including the set of assets and mixed asset metadata, the mixed asset metadata including private metadata and public metadata for one or more rules set by the source and associated with the mixed asset, the private metadata including a first set of rules accessible by a restricted set of users authorized to access the first set of rules and the public metadata including a second set of rules, and at least a portion of the first set of rules is different from at least a portion of the second set of rules;
determining, for the mixed asset including the set of assets, an estimate associated with a cost for incorporating the set of assets into the mixed asset;
transferring, responsive to a receiving a confirmation from the source associated with the estimate, information related to the mixed asset to a second digital wallet in the one or more blockchains, the information being immutably stored within the second digital wallet as a second digital token including both the mixed asset and a second private key, wherein the second digital token is authenticated using a second public key corresponding to a second address of the second digital wallet, wherein the second private key and the second public key are part of a second key-pair generated for the second digital token;
determining usage of the mixed asset recorded by a digital streaming provider in accordance with at least some of the one or more rules based on captured usage and consumption data of the mixed asset recorded by the digital streaming provider; and updating the information related to the at least one asset in the first digital wallet based, at least, on the usage of the mixed asset recorded by the digital streaming provider.

18. The computer-implemented method of claim 17, wherein the at least one asset is one of a composition asset associated with the identified portions of the media content and a recording asset associated with the identified portions of the media content.

19. The computer-implemented method of claim 17, wherein the information relates to a payment amount based at least in part on the at least one asset.

20. The computer-implemented method of claim 17, wherein the first digital wallet makes use of at least one pair of public-private cryptographic keys to sign and verify transactions within a blockchain.

\* \* \* \* \*